US012609311B2

(12) United States Patent
Zhang et al.

(10) Patent No.: US 12,609,311 B2
(45) Date of Patent: *Apr. 21, 2026

(54) OXIDATIVE DELITHIATION OF ALKALI NICKEL OXIDE

(71) Applicant: DURACELL U.S. OPERATIONS, INC., Wilmington, DE (US)

(72) Inventors: Fan Zhang, Newtown, CT (US); Paul A. Christian, Bethel, CT (US); Jennifer A. Nelson, Waltham, MA (US); David L. Anglin, Bethel, CT (US); Paul Wildgust, Bethel, CT (US); Thomas Baccaro, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/625,736

(22) Filed: Apr. 3, 2024

(65) Prior Publication Data

US 2024/0282957 A1 Aug. 22, 2024

Related U.S. Application Data

(63) Continuation of application No. 17/248,404, filed on Jan. 22, 2021, now Pat. No. 11,984,594.

(60) Provisional application No. 62/965,139, filed on Jan. 23, 2020.

(51) Int. Cl.
| | |
|---|---|
| *H01M 4/04* | (2006.01) |
| *H01M 4/36* | (2006.01) |
| *H01M 4/525* | (2010.01) |

(52) U.S. Cl.
CPC ......... *H01M 4/525* (2013.01); *H01M 4/0471* (2013.01); *H01M 4/366* (2013.01)

(58) Field of Classification Search
None
See application file for complete search history.

(56) References Cited

U.S. PATENT DOCUMENTS

| | | | |
|---|---|---|---|
| 6,783,893 | B2 | 8/2004 | Bowden et al. |
| 8,298,706 | B2 | 10/2012 | Christian et al. |
| 9,793,542 | B2 | 10/2017 | Nelson et al. |
| 2004/0262571 | A1 | 12/2004 | Barker et al. |
| 2013/0247363 | A1* | 9/2013 | Nelson ..................... H01M 4/26 252/182.1 |
| 2015/0280234 | A1 | 10/2015 | Nelson et al. |
| 2018/0331361 | A1 | 11/2018 | Nelson et al. |

FOREIGN PATENT DOCUMENTS

| | | |
|---|---|---|
| CN | 101378118 A | 3/2009 |
| CN | 101939863 A | 1/2011 |
| CN | 104220381 A | 12/2014 |
| CN | 104995782 A | 10/2015 |
| CN | 110112406 A | 8/2019 |
| GB | 1502793 A | 3/1978 |
| WO | WO-2004/015794 A1 | 2/2004 |
| WO | WO-2009100248 A1 | 8/2009 |
| WO | WO-2011112758 A1 | 9/2011 |
| WO | WO-2013142637 A1 | 9/2013 |
| WO | WO-2014110164 A1 | 7/2014 |

OTHER PUBLICATIONS

Japanese Patent Application No. 2022-538880, Office Action, dated Mar. 28, 2025.
Abualreish, Physical parameters of the uncatalysed thermal decomposition of potassium peroxydisulphate in neutral solution, Material Science Research India, 5(2):261-6 (2008).
Abualreish, The influences of catalysts and co-catalysts on the thermal decomposition of potassium peroxydisulphate in aqueous solution, at 70° C., Am. J. Chem., 2(4):214-7 (2012).
Abualreish, The inhibitory and catalyzing effects of different materials on the thermal decomposition of potassium peroxydisulphate in aqueous solution at 70° C., Int. J. Chem., 4(3):121-7(2012).
Arai et al., Characteristics of LixNiO2 obtained by chemical delithiation, Journal of Power Sources, 81-82:401-5 (1999).
Arai et al., Nickel dioxide polymorphs as lithium insertion electrodes, Electrochimica Acta, 47(17):2697-705 (2002).
Arai et al., Structural and Thermal Chracteristics of Nickel Dioxide Drived from LiNiO2, Journal of Solid State Chemistry 163, 340-349 (2002).
Arai et al., Synthesis and electrode performance of layered nickel dioxide containing alkaline ions, Electrochimica Acta, 50(9):1821-8 (2005).
Ball et al. "The Kinetics and Mechanism of the Decomposition of Caro's Acid" (1955).
Bawn et al., Molecular Dissociation Processes in Solution, Part 4.—The Rate of Decomposition of Persulphate Ion and its Catalysis by Metal Ions, Trans. Faraday Soc., 51:925-934 (1955).
Beylerian et al., Kinetics and Mechanism of Potassium Persulfate Decomposition in Aqueous Solutions Studied by a Gasometric Method, Macromol. Chem. Phys., 203(1):212-18 (2002).
Chebiam al.,, Comparison of the chemical stability of the high energy density cathodes of lithium-ion batteries, Electrochemistry Communications, 3(11):624-7 (2001).

(Continued)

*Primary Examiner* — Austin Murata
(74) *Attorney, Agent, or Firm* — MARSHALL, GERSTEIN & BORUN LLP

(57) ABSTRACT

Provided are methods of preparing an electrochemically active cathode material including the steps of combining an alkali metal-containing nickel oxide having a formula $A_{1-a}Ni_{1+a}O_2$, wherein A comprises an alkali metal and $0<a\le0.2$, with a fluid composition including an oxidant comprising a peroxydisulfate salt, a monopersulfate salt, or a combination thereof to form a mixture, heating the mixture to a temperature of 50° C. or greater; and maintaining the mixture at the temperature for at least a period of time sufficient to form an alkali metal-deficient nickel oxide electrochemically active cathode material having a general formula $A_xH_yNi_{1+a}O_2 \cdot nH_2O$, wherein A comprises an alkali metal; $0.08\le x<0.2$; $0\le y<0.3$; $0.02\le a\le0.2$; and $0<n<2$.

22 Claims, 1 Drawing Sheet

(56)                    References Cited

OTHER PUBLICATIONS

Chen et al., "Soft X-ray absorption spectroscopy studies on the chemically delithiated commercial LiCo)2 cathode material;" Journal of Power Sources 174 (2007) 938-943.

Chinese Patent Application No. 202180007580.5, Office Action and Search Report, dated Nov. 13, 2023.

Choi et al., Factors influencing the layered to spinel-like phase transition in layered oxide cathods, J. Electrochemical Soc., 149(9):A1157-A1163 (2002).

Gabrisch et al., Thermal decomposition of LixCoO2 monitored by electron energy loss spectroscopy and magnetic susceptibility measurements, Solid State Ionics, 181:71-8 (2010).

House, Kinetics and mechanism of oxidations by peroxydisulfate, Chem. Rev., 62(3):185-203 (1962).

Idemoto et al., "Thermodynamic stability, crystal structure, and cathodic performance of Lix(Mn1/3Co1/3 Ni 1/3)O2 depend on the synthetic process and Li content;" Solid State Ionics 179 (2008) 625-635.

International Application No. PCT/US2021/014791, International Search Report and Written Opinion, mailed May 10, 2021.

Ji et al., $Li^+$ extraction from spiel-type $LiMN_2O_4$ in different eluents and Li+ insertion in the aqueous phase, Solvent Extraction and Ion Exchange, 34(6):549-57 (2016).

Ji et al., Lithium extraction process on spinel-type $LiMN_2O_4$ and characterization based on the hydrolysis of sodium persulfate, Solid State Ionics, 301:116-24 (2017).

Johnson et al., Persulfate persistence under thermal activation conditions, Environ. Sci. Technol., 42:9650-6 (2008).

Kolthoff et al. "The Chemistry of Persulfate. I. The Kinetics and Mechanism of the Decomposition of the Persulfate Ion in Aqueous Medium" (1950).

Kolthoff et al., The chemistry of persulfate. I. The kinetics and mechanism of the decomposition of the persulfate ion in aqueous medium, J. Am. Chem. Soc., 73(7):3055-9 (1951).

Liu et al., Lithium ordering in chemically delithiated $Li_xCoO_2$, Acta Metall. Sin. (Engl. Lett.), 19(3):197-202 (2006).

Mosbah et al., "Phases LixMn02a Rattachees Au Type Spinelle;" Mat. Res. Bull., vol. 18, pp. 1375-1381, 1983.

Okada et al., "Synthesis and Thermal Stability of Chemical Delithiated Lithium Manganes Oxide Spinels;" Electrochemical Society Proceedings vol. 99-25.

Park et al., Structure and magnetism of the mono-layer hydrate Na0.3NiO2•0.7H2O, Solid State Commun., 142:75-9 (2007).

Park et al., Synthesis and structure of the bilayer hydrate Na0.3NiO2.1.3D2O, Inorg. Chem., 45(9):3490-2 (2006).

Park et al., Synthesis and structure of the monolayer hydrate K0.3CoO2.0.4H2O, Solid State Commun., 134:607-11 (2005).

Persulfates Technical Information, FMC Corporation, 16 pp. (2001).

Sekizawa et al., "Crystal and electronic structure change determined by various method for delithiation process of Lix(Ni, Mn)O2-based cathode material;" Journal of Power Sources 196 (2011) 6651-6656.

Tang et al., Lithium ion extraction from orthorhombic LiMnO2 in ammonium peroxodisulfate solutions, J. Solid State Chem., 142:19-28 (1999).

Yan et al., Chemical extraction preparation of delithiated cathode materials of Li-ion battery, J. Wuhan University of Technology, Materials Science Ed., 24:863-6 (2009).

Yan et al., Preparation of Delithiated Cathode Materials of Li-Ion Battery by Chemical Extraction Employing Na2S2O8, Adv. Mater. Res., 512-515:969-75 (2012).

Yuan et al., Effective recycling performance of Li+ extraction from spinel-type $LiMN_2O_4$ with persulfate, Int. Eng. Chem. Res., 53:9689-96 (2014).

Zheng et al., The effects of persulfate treatment on electrochemical properties of Li[Li0.2Mn0.54Ni0.13Co0.13]O2 cathode material, J. Power Sources, 221:108-113 (2013).

* cited by examiner

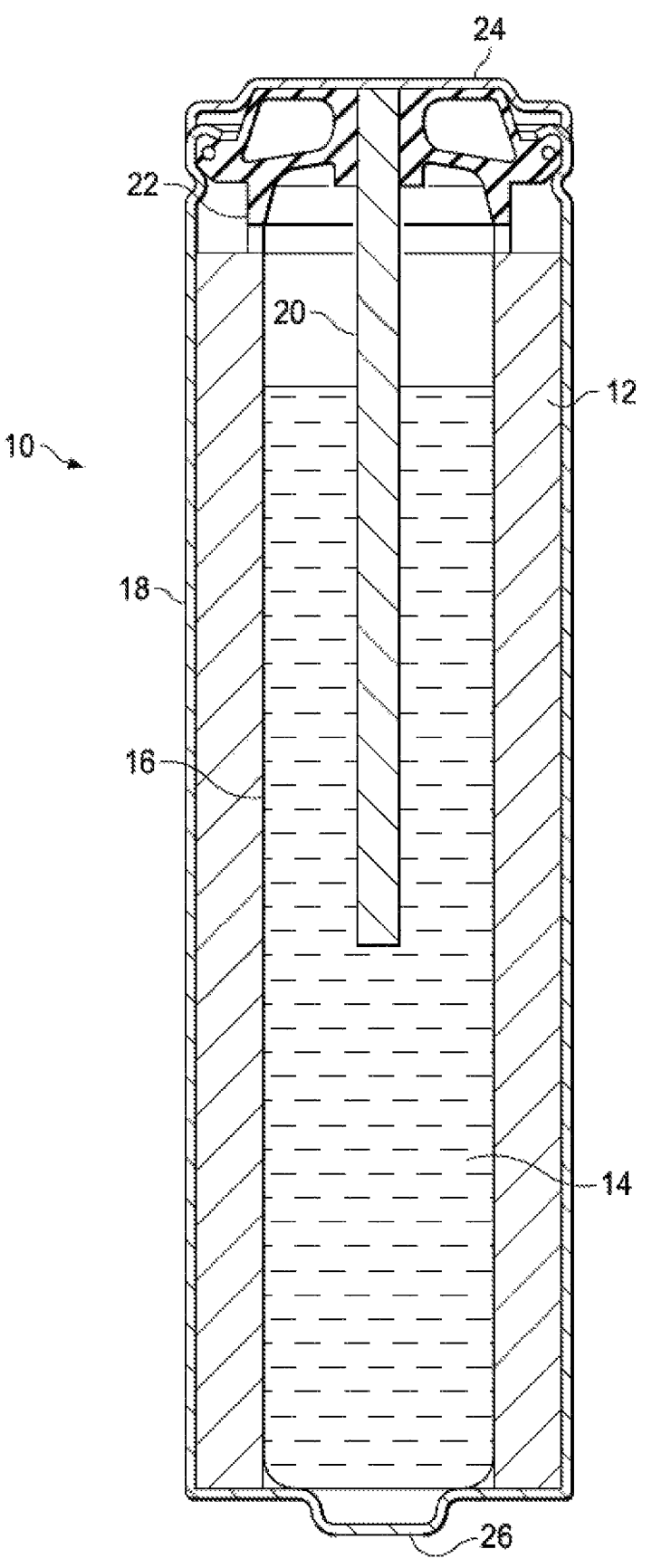

OXIDATIVE DELITHIATION OF ALKALI NICKEL OXIDE

CROSS-REFERENCE TO RELATED APPLICATION

This application is a continuation application of U.S. patent application Ser. No. 17/248,404, filed Jan. 22, 2021, which claims the benefit under 35 U.S.C. § 119(e) of U.S. Provisional Patent No. 62/965,139, filed Jan. 23, 2020, the entire disclosures of which are incorporated herein by reference.

FIELD OF THE DISCLOSURE

The disclosure relates generally to the oxidative demetallation of an alkali nickel oxide. More specifically, the disclosure relates to the oxidative demetallation of an alkali nickel oxide using a persulfate salt.

BACKGROUND

Alkali metal-containing transition metal oxides can be energetically activated or "charged" for the purpose of preparing highly oxidized cathode materials for use in both primary and secondary electrochemical cells. Charging of the alkali metal-containing transition metal oxides comprises oxidation of the transition metal and removal of the alkali metal from the metal oxide crystal lattice, in part or in whole, to form an alkali metal-deficient transition metal oxide electrochemically active cathode material. The alkali metal-containing transition metal oxides can be chemically charged or electrochemically charged. Methods of chemically charging the alkali metal-containing transition metal oxides can include oxidative demetallation and acid-promoted disproportionation of the transition metal, e.g., by treatment with a mineral acid.

It is known that acid-promoted disproportionation of alkali metal-containing transition metal oxides including metals such as Mn and Ni results in extraction of essentially all the alkali metal ions present from the crystal lattice as well as oxidation of at most 50% of the metal, for example from an M(III) oxidation state to an M(IV) oxidation state. A corresponding amount of the M(Ill) is reduced to M(II), which dissolves in the acid solution.

The acid-promoted disproportionation reaction can be summarized, using stoichiometric layered lithium nickel oxide as an example, as follows in Equation 1:

$$LiNiO_2 + 2y\ H_2SO_4 \rightarrow (1-y)\ Li_{(1-2y)/(1-y)}NiO_2 + y\ NiSO_4 + y\ Li_2SO_4 + 2y\ H_2O\ (0 \leq y \leq \frac{1}{2}) \quad (1)$$

The Ni(II) ions are soluble and dissolve in the aqueous acid solution. Thus, use of an acid-promoted metal disproportionation reaction to chemically charge an alkali metal containing transition metal oxide is very inefficient since at least half of the M(Ill) ions in the starting transition metal oxide are reduced to M(II) ions that can dissolve in the acid solution and, thus, are extracted out of the crystal structure.

Chemically charging an alkali metal-containing transition metal oxide with a strong, soluble chemical oxidant can be used to directly oxidize the transition metal to a higher oxidation state and result in the removal of a proportional amount of alkali metal ions to maintain overall electroneutrality of the crystal lattice. Various reagents such as strongly oxidizing gases (e.g., ozone, chlorine or bromine), strongly oxidizing solid reagents (e.g., nitrosonium hexafluorophosphate, nitrosonium tetrafluorborate, nitrosonium hexafluoroarsenate, nitronium tetrafluoroborate, nitronium hexafluorophosphate, nitronium hexafluoroarsenate), and water soluble oxidizing agents (e.g., alkali or alkaline earth metal hypochlorites (e.g., $Na^+$, $K^+$, $Ca^{2+}$), alkali peroxydisulfates (e.g., $Na^+$, $K^+$), ammonium peroxydisulfate, and alkali monopersulfates (e.g., $Na^+$, $K^+$) have been used to chemically charge alkali metal-containing transition metal oxides. Other water soluble oxidizing agents include alkali permanganates (e.g., $K^+$, $Na^+$, $Li^+$) and alkali ferrates (e.g., $K^+$). Methods using water soluble oxidizing agents are typically performed near room temperature over 24 to 48 hours; however such methods often lack sufficient oxidation strengths to rapidly and sufficiently oxidize the transition metal and demetallate the starting alkali metal-containing transition metal oxide to prepare an alkali metal-deficient metal oxide having a formula of $A_xMO_2$ or $A_xM_2O_4$ where A is the alkali metal and M is the transition metal, for example, wherein x is less than about 0.3.

Thus, known methods of chemically charging alkali metal-containing, layered transition metal oxides have multiple drawbacks such as low yields due to the disproportionation of the transition metal, incomplete oxidation of the transition metal, and/or extended treatment times, for example, 12-72 hours, and expensive reagents (e.g., nitrosonium salts, nitronium salts).

SUMMARY

One aspect of the disclosure provides a method of preparing an electrochemically active cathode material including the steps of combining an alkali metal-containing nickel oxide having a formula $A_{1-a}Ni_{1+a}O_2$, wherein A comprises an alkali metal and $0<a\leq0.2$, with a fluid composition including an oxidant comprising a peroxydisulfate salt, a monopersulfate salt, or a combination thereof to form a mixture, heating the mixture to a temperature of 50° C. or greater; and maintaining the mixture at the temperature for at least a period of time sufficient to form an alkali metal-deficient nickel oxide electrochemically active cathode material having a general formula $A_xH_yNi_{1+a}O_2 \cdot nH_2O$, wherein A comprises an alkali metal; $0.08 \leq x < 0.2$; $0 \leq y < 0.3$; $0.02 \leq a \leq 0.2$; and $0 < n < 2$.

Another aspect of the disclosure provides a method of preparing an electrochemically active cathode material including the steps of combining an alkali metal-containing nickel oxide having a formula $A_{1-a}Ni_{1+a-z}M_zO_2$, wherein A comprises an alkali metal and $0<a\leq0.2$, M comprises a transition metal or main group metal, and $0 \leq z \leq 0.2$, with a fluid composition including an oxidant comprising a peroxydisulfate salt, a monopersulfate salt, or a combination thereof to form a mixture, heating the mixture to a temperature of 50° C. or greater; and maintaining the mixture at the temperature for at least a period of time sufficient to form an alkali metal-deficient nickel oxide electrochemically active cathode material having a general formula $A_xH_yNi_{1+a-z}M_zO_2 \cdot nH_2O$, wherein A comprises an alkali metal; $0.08 \leq x < 0.2$; $0 \leq y < 0.3$; $0.02 \leq a \leq 0.2$; M comprises a transition metal or a main group metal, $0 \leq z \leq 0.2$; and $0 < n < 2$.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the disclosure to the specific embodiments described herein.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

FIG. 1 is a cross-section of an embodiment of a primary alkaline battery of the disclosure.

DETAILED DESCRIPTION

The disclosure provides a method of preparing an electrochemically active cathode material including the steps of combining an alkali metal-containing nickel oxide having a formula $A_{1-a}Ni_{1+a}O_2$, wherein A comprises an alkali metal and $0<a\leq0.2$, with a fluid composition including an oxidant comprising a peroxydisulfate salt, a monopersulfate salt, or a combination thereof to form a mixture, heating the mixture to a temperature of 50° C. or greater; and maintaining the mixture at the temperature for at least a period of time sufficient to form an alkali metal-deficient nickel oxide electrochemically active cathode material having a general formula $A_xH_yNi_{1+a}O_2 \cdot nH_2O$, wherein A comprises an alkali metal; $0.08\leq x<0.2$; $0\leq y<0.3$; $0\leq z\leq0.2$; and $0<n<2$.

It is known in the art that peroxydisulfate salts and monopersulfate salts can undergo autocatalytic thermal decomposition in aqueous solutions, evolving oxygen gas and forming sulfuric acid as decomposition products, at temperatures above 50° C., in particular, at temperatures above 60° C., 65° C., 70° C. or at about 80° and above. Further, it is known in the art that alkali metal-containing layered nickel oxides can undergo acid promoted disproportionation in the presence of a mineral acid such as sulfuric acid. This disproportionation reaction can be summarized, for example, as follows for the layered lithium nickel oxide:

$$LiNiO_2 + 2yH_2SO_4 \rightarrow (1-y)Li_{(1-2y)/(1-y)}NiO_2 + y$$
$$NiSO_4 + yLi_2SO_4 + 2yH_2O (0 \leq y \leq 0.5).$$

Thus, one of ordinary skill in the art would expect that at temperatures of greater than about 50° C., for example about 60° C. and above, the oxidant would begin decomposing and forming sulfuric acid, which would be expected to promote disproportionation of the alkali metal-containing nickel oxide, resulting in a maximum of about a 50% or less yield of the alkali metal-deficient nickel oxide, relative to the initial amount of the alkali metal-containing nickel oxide.

Moreover, it is known in the art that solubilized Ni(II) ions, which are formed during disproportionation, can catalyze the decomposition of peroxydisulfate salts and monopersulfate salts forming sulfuric acid as a decomposition product. Such further breakdown of the oxidant would be expected by one of ordinary skill in the art to reduce yields of the alkali metal-deficient layered nickel oxide even further, due to decreased amounts of oxidant available for the oxidative demetallation reaction as well as the generation of increased amounts of sulfuric acid available to promote the disproportionation reaction.

It was surprisingly and unexpectedly found that methods of the disclosure for the conversion of the alkali metal-containing nickel oxide to the alkali metal-deficient nickel oxide can include heating the alkali metal-containing nickel oxide with the oxidant at a temperature greater than 50° C. and typically between 60° C. and up to about 85° C., without significant reduction in yield due to decomposition of the oxidant and/or disproportionation of the alkali metal-containing nickel oxide. Without intending to be bound by theory, it is believed that as the temperature of the fluid composition increases, the rate of conversion of the alkali metal-containing nickel oxide to the alkali metal-deficient nickel oxide due to oxidative demetallation increases and although an increase in temperature simultaneously facilitates decomposition of the oxidant to sulfuric acid, significant thermal decomposition of the oxidant (which detrimentally affects the yield of the desired alkali metal-deficient nickel oxide) is advantageously not observed. Surprisingly and advantageously, the formation of the alkali metal-deficient nickel oxide is achieved in over 50% yield over relatively short (e.g., less than 24 hours, less than 12 hours, or less than 6 hours) reaction times.

In particular, based on the knowledge in the art, it was unexpected that the reaction temperature could be increased above 50° C., above 60° C., and/or above 70° C., for example, without complete destruction of the oxidant. In this regard, a destructive cascade effect would have been expected wherein, (a) the thermal decomposition of the oxidant forms an acid, (b) the acid facilitates disproportionation of the Ni(Ill) of the alkali metal-containing nickel oxide to Ni(IV) and Ni(II), (c) the acid further solubilizes and leaches the Ni(II) out of the metal oxide structure, and (d) the solubilized Ni(II) further decomposes the remaining oxidant, such that the alkali metal-containing nickel oxide having a formula $A_{1-a}Ni_{1+a}O_2$ is substantially consumed in a non-productive fashion and thus formation of the desired alkali metal-deficient nickel oxide is significantly decreased. Instead, it was surprisingly found that at temperatures above 50° C., in particular, above 60° C. or 70° C., the formation of the alkali metal-deficient transition metal oxide was observed in excellent yields, particularly relative to amounts expected when acid-promoted disproportionation occurs.

Thus, the methods of the disclosure advantageously provide one or more benefits, for example, providing an oxidative demetallation process having relatively short treatment time, providing alkali metal-deficient nickel oxides in relatively high yield (e.g., greater than about 70%), minimizing environmentally hazardous waste solutions containing $Ni^{2+}$ and sulfuric acid.

The term "about" is used according to its ordinary meaning, for example, to mean approximately or around. In one embodiment, the term "about" means±10% of a stated value or range of values. In another embodiment, the term "about" means±5% of a stated value or range of values. A value or range described in combination with the term "about" expressly includes the specific value and/or range as well (e.g., for a value described as "about 40," "40" is also expressly contemplated).

As used herein, an alkali metal-deficient nickel oxide electrochemically active cathode material that has a "high discharge capacity" refers to an alkali metal-deficient nickel oxide having a gravimetric discharge capacity equal to or greater than about 420 mAh/g, when discharged at a low discharge rate as the cathode active material in an alkaline cell. As used herein, and unless specified otherwise, a "low discharge rate" refers to a fully charged battery that discharges over the course of about 30 to about 40 hours, i.e., a battery having about C/30 to about C/40 rate. The C-rate is a well understood measurement in the art that communicates the rate at which a battery is discharged relative to its theoretical rated capacity. It is defined as the discharge current divided by the theoretical discharge current under which the battery would deliver its total nominal/theoretical rated capacity in 1 hour. For example, a 1 C discharge rate for a material having a gravimetric discharge capacity of about 420 mAh/g would deliver the total 420 mAh/g capacity in 1 hour. A 2 C rate would deliver the total 420 mAh/g capacity in 0.5 hour. A C/2 rate would deliver the 420 mAh/g in 2 hours. Thus, a C/40 rate for DLNO would deliver the total 420 mAh/g capacity in 40 hours.

Alkali metal-deficient nickel oxide electrochemically active cathode materials prepared solely by treatment of alkali metal-containing nickel oxide with aqueous sulfuric acid typically have a low discharge rate (e.g., C/40) gravimetric discharge capacity in a range of about 390 to about 420 mAh/g. Thus, the methods of the disclosure can provide electrochemically active cathode materials having comparable, if not higher, low rate discharge capacities than materials prepared by other methods known in the art. In embodiments, the alkali metal-deficient layered nickel oxide electrochemically active cathode material has a gravimetric discharge capacity equal to or greater than about 420 mAh/g when discharged at a low discharge rate as the cathode active material in an alkaline electrochemical cell, for example, in a range of about 420 mAh/g to about 460 mAh/g, about 420 mAh/g to about 450 mAh/g, about 420 mAh/g to about 445 mAh/g, about 420 mAh/g to about 435 mAh/g, about 420 mAh/g to about 430 mAh/g, about 420 mAh/g to about 425 mAh/g, about 430 mAh/g, about 435 mAh/g, about 440 mAh/g, about 445 mAh/g, about 450 mAh/g, about 455 mAh/g, or about 460 mAh/g.

Alkali Metal-Containing Nickel Oxide

In general, the alkali metal-containing nickel oxide to be oxidatively demetallated can be a stoichiometric or non-stoichiometric alkali metal-containing layered nickel oxide. The non-stoichiometric alkali metal-containing layered nickel oxide has a general formula $A_{1-a}Ni_{1+a}O_2$, wherein A is an alkali metal and $0 < a \leq 0.2$. The alkali metal-containing layered nickel oxide has a layered structure. A can be selected from the group consisting of lithium, sodium, potassium, and a combination thereof. In embodiments, A comprises lithium. In embodiments, some of the alkali metal in the alkali metal-containing layered nickel oxide can be substituted with a metal ion having a similar ionic radii, for example, $Li^+$, $Ni^{2+}$, $Ni^{3+}$, $Na^+$, $K^+$, $Cs^+$, $Rb^+$, $Ag^+$, $Mg^{2+}$, $Ca^{2+}$, and $Bi^{3+}$, in a range of 0 to about 10 wt. %, based on the total weight of A in the structure. Without intending to be bound by theory, it is believed that the ionic radii of $Rb^+$ and $Cs^+$ are too large to be the primary alkali metal as they are unable to form a stable layered structure having a structure equivalent to lithium nickel oxide or sodium nickel oxide.

In embodiments, the alkali metal-containing nickel oxide can include a metal dopant, M, and have a formula $A_{1-a}Ni_{1+a-z}M_zO_2$, wherein A comprises an alkali metal, $0 < a \leq 0.2$, M comprises a transition metal or main group metal, and $0 \leq z \leq 0.2$.

In embodiments of the alkali metal-containing nickel oxide, $0 < a \leq 0.2$, for example, 0.01 to 0.20, 0.01 to 0.18, 0.01 to 0.16, 0.01 to 0.15, 0.02 to 0.20, 0.02 to 0.18, 0.02 to 0.16, 0.02 to 0.15, 0.03 to 0.20, 0.03 to 0.19, 0.03 to 0.15, 0.03 to 0.12, 0.05 to 0.19, or 0.05 to 0.15. Because a is always greater than 0, there are alkali metal sites in the crystal lattice which do not include alkali metal ions but, instead, can be vacant or occupied by excess Ni(II) ions, thereby providing a non-stoichiometric amount of nickel and alkali metal, relative to the stoichiometric counterpart having a general formula $ANiO_2$ or $ANi_{1-z}M_zO_2$, wherein A in an alkali metal, M comprises a transition metal or main group metal, and $0 \leq z \leq 0.2$.

In embodiments, wherein the alkali metal-containing layered nickel oxide includes a metal dopant, M, the metal dopant can include a transition metal, main group metal, or both. In general, the metal dopant is a metal that can access an oxidation state of +3 or greater and has an ionic radius comparable to that of the Ni(III) (about 0.60 Å), for example, in a range of about 0.45 Å to about 0.75 Å. In embodiments, the transition metal comprises cobalt ($Co^{3+}$, $Co^{4+}$), manganese ($Mn^{3+}$, $Mn^{4+}$, $Mn^{7+}$), iron ($Fe^{3+}$, $Fe^{4+}$), chromium ($Cr^{3+}$, $Cr^{4+}$, $Cr^{1+}$), vanadium ($V^{3+}$, $V^{5+}$), titanium ($Ti^{3+}$, $Ti^{4+}$), niobium ($Nb^{3+}$, $Nb^{5+}$), zirconium ($Zr^{4+}$) or a combination thereof. In embodiments, the transition metal comprises cobalt, manganese, iron or a combination thereof. In embodiments, the transition metal comprises cobalt. In embodiments, the transition metal comprises manganese. In embodiments, the transition metal comprises cobalt and manganese. The main group metal can be selected from the group consisting of aluminum ($Al^{3+}$), gallium ($Ga^{3+}$), bismuth ($Bi^{5+}$), and a combination thereof. In embodiments, the main group metal comprises aluminum.

In embodiments wherein the alkali metal-containing nickel oxide includes a metal dopant, z can be $0 \leq z \leq 0.2$, for example, 0 to 0.20, 0.01 to 0.20, 0.01 to 0.18, 0.01 to 0.16, 0.01 to 0.15, 0.02 to 0.20, 0.02 to 0.18, 0.02 to 0.16, 0.02 to 0.15, 0.03 to 0.20, 0.03 to 0.19, 0.03 to 0.15, 0.03 to 0.12, 0.05 to 0.19, or 0.05 to 0.15. Without intending to be bound by theory, it is believed that as the amount of metal dopant in the alkali metal-containing nickel oxide and the alkali metal-deficient nickel oxide prepared therefrom increases, the stability of an electrochemically active material including the alkali metal-deficient nickel oxide to an aqueous hydroxide solution, such as an alkaline battery electrolyte, increases but the total discharge capacity can decrease, for example, when the dopant metal is not electrochemically active in the same voltage window as nickel.

In general, the alkali metal-containing nickel oxide is essentially non-hydrated; however, there may be excess alkali metal oxide and hydroxide from the synthesis of the alkali metal-containing nickel oxide present on the surface of the alkali metal-containing nickel oxide particles which can absorb water from ambient air. The alkali metal oxide and hydroxide also can react with carbon dioxide in the ambient air to form alkali metal carbonate on the surface of the alkali metal-containing layered nickel particles.

Alkali Metal-Deficient Nickel Oxide Electrochemically Active Cathode Material

In general, the alkali metal-deficient nickel oxide electrochemically active cathode material that is formed according to the method disclosed herein has a general formula $A_xH_yNi_{1+a}O_2 \cdot nH_2O$, wherein A comprises an alkali metal; $0.08 \leq x < 0.2$; $0 < y < 0.3$; $0 \leq z \leq 0.2$; and $0 < n < 2$. The alkali metal-deficient nickel oxide is also referred to herein as alpha-demetallated nickel oxide. The average oxidation state of the nickel in the alpha-demetallated nickel oxide is generally between 3+ and 4+ as the alpha-demetallated nickel oxide will include a significant portion of nickel in the 4+ oxidation state as well as some nickel in the 3+ oxidation state. As described below, the alpha-demetallated nickel oxide also includes a portion of nickel in the 2+ or 3+ oxidation state located in alkali metal sites of the crystal lattice. It will be understood that the A in the formula for the alpha-demetallated nickel oxide electrochemically active cathode material will be the same as the A in the formula for the alkali-metal containing nickel oxide material used to prepare the alpha-demetallated material. Thus, A can be selected from the group consisting of lithium, sodium, potassium, and a combination thereof. In embodiments, A is lithium. In embodiments, some of the alkali metal in the alkali metal-containing nickel oxide can be substituted with a metal ion having a similar ionic radii, for example, $Li^+$, $Ni^{2+}$, $Ni^{3+}$, $Na^+$, $K^+$, $Cs^+$, $Rb^+$, $Ag^+$, $Mg^{2+}$, $Ca^{2+}$, and $Bi^{3+}$.

In embodiments, the alpha-demetallated nickel oxide can include a metal dopant, M, and have a formula $A_xH_yNi_{1+a-z}$ $M_zO_2 \cdot nH_2O$, wherein A comprises an alkali metal; $0.08 \leq x < 0.2$; $0 \leq y < 0.3$; $0.02 \leq a \leq 0.2$; M comprises a transition metal or a main group metal, $0 \leq z \leq 0.2$; and $0 < n < 2$.

In embodiments, including those including a metal dopant, the alpha-demetallated nickel oxide can have a value of x in a range of $0.08 < x < 0.2$, for example, 0.08 to 0.20, 0.08 to 0.18, 0.08 to 0.16, 0.08 to 0.15, 0.09 to 0.20, 0.09 to 0.19, 0.09 to 0.15, 0.09 to 0.12, 0.10 to 0.19, or 0.10 to 0.15. A value of x for the alpha-demetallated nickel oxide below about 0.08 can be the result of one or more of an excess amount of the oxidant provided during the oxidative demetallation, too high of a reaction temperature during the oxidative demetallation, and/or too long reaction time for the oxidative demetallation, and thus it is desirable to control these parameters. A value of x for the alpha-demetallated nickel oxide above about 0.2 can be the result of one or more of an insufficient amount of the oxidant provided during the oxidative demetallation, too low of a reaction temperature for the oxidative demetallation, and/or too short reaction time for the oxidation demetallation, further demonstrating that it is desirable to control these parameters. Without intending to be bound by theory, it is believed that as the amount, x, of alkali metal, A, in the alpha-demetallated nickel oxide decreases below about 0.08, for example, 0.06, 0.04, 0.02, or less, the alpha-demetallated nickel oxide is disadvantageously more likely to form gamma-nickel oxy-hydroxide when treated with an aqueous solution of an alkali hydroxide rather than the desirable stabilized form of the alkali metal-deficient nickel oxide (which has an additional alkali metal ion inserted into vacant sites in layers thereof and has the formula $A_xA'_yNi_{1+a}O_2 \cdot nH_2O$, wherein A includes Li or Na; A' includes K, Rb, or Cs; $0.08 \leq x < 0.2$; $0.03 < v < 0.20$; $0.02 \leq a \leq 0.2$; and $0 < n < 2$, as described in detail below). Further, without intending to be bound by theory, it is believed that as the amount, x, of alkali metal, A, of the alpha-demetallated nickel oxide increases above about 0.2, the capacity of the prepared alpha-demetallated nickel oxide (as well as the stabilized nickel oxide prepared therefrom) decreases as a result of the presence of unoxidized Ni(Ill) (i.e., unconverted alkali metal-containing layered nickel oxide starting material).

In embodiments, including those including a metal dopant, the alpha-demetallated nickel oxide can have a value of y in a range of $0 \leq y < 0.3$, for example, 0 to 0.29, 0.05 to 0.29, 0.05 to 0.25, 0.5 to 0.20, 0.5 to 0.15, 0.08 to 0.29, 0.08 to 0.25, 0.08 to 0.20, 0.08 to 0.15, 0.10 to 0.29, 0.10 to 0.25, 0.10 to 0.20, or 0.10 to 0.15. $H^+$ can be introduced into the crystal structure during the oxidative demetallation process via ion-exchange with the alkali metal cation. In particular, when the oxidative demetallation is performed in an aqueous solution, under some conditions water can react with the oxidant to form $H^+$ ions which can subsequently partially ion exchange with the alkali metal cations, especially at high temperatures.

In embodiments, including those including a metal dopant, the alpha-demetallated nickel oxide can have a value of a in a range of $0.02 \leq a \leq 0.2$, for example, 0.02 to 0.20, 0.02 to 0.18, 0.02 to 0.16, 0.02 to 0.15, 0.03 to 0.20, 0.03 to 0.18, 0.03 to 0.16, 0.03 to 0.15, 0.04 to 0.20, 0.04 to 0.18, 0.04 to 0.15, 0.04 to 0.12, 0.05 to 0.19, or 0.05 to 0.15. Because a must be greater than 0, there are alkali metal sites in the crystal lattice which do not include an alkali metal ion but, instead, are occupied by $Ni^{2+}$ or $Ni^{3+}$ ions thereby providing an excess, non-stoichiometric amount of nickel. It will be appreciated by one of ordinary skill in the art that some alkali metal sites in the crystal lattice can be vacant and, further, that charge neutrality of the structure will be maintained by substitution of one $Ni^{2+}$ ion for 2 $Li^+$ ions, or one $Ni^{3+}$ ion for 3 $Li^+$ ions (or one $Ni^{2+}$ ion and one $Li^+$ ion).

In embodiments wherein the alkali metal-containing nickel oxide containing starting material includes a metal dopant, M, it will be understood that the M in the formula for the alpha-demetallated nickel oxide electrochemically active cathode material will be the same as the M in the formula for the alkali-metal containing nickel oxide material used to prepare the alpha-demetallated material. Thus, M can include a transition metal, main group metal, or both. In general, the metal dopant is a metal that can access an oxidation state of +3 or greater and has an ionic radius comparable to that of the Ni(Ill).

In embodiments, the transition metal comprises cobalt ($Co^{3+}$, $Co^{4+}$), manganese ($Mn^{3+}$, $Mn^{4+}$, $Mn^{7+}$), iron ($Fe^{3+}$, $Fe^{4+}$), chromium ($Cr^{3+}$, $Cr^{4+}$, $Cr^{5+}$), vanadium ($V^{3+}$, $V^{5+}$), titanium ($Ti^{3+}$, $Ti^{4+}$), niobium ($Nb^{3+}$, $Nb^{5+}$), zirconium ($Zr^{4+}$) or a combination thereof. In embodiments, the transition metal comprises cobalt, manganese, or a combination thereof. In embodiments, the transition metal comprises cobalt. In embodiments, the transition metal comprises manganese.

In embodiments, the transition metal comprises cobalt and manganese. In embodiments, the transition metal comprises cobalt and manganese. The main group metal can be selected from the group consisting of aluminum ($Al^{3+}$), gallium ($Ga^{3+}$), bismuth ($Bi^{5+}$), and a combination thereof. In embodiments, the main group metal comprises aluminum.

In embodiments wherein the alpha-demetallated nickel oxide material includes a metal dopant, z can have a value in a range of $0 \leq z \leq 0.2$, for example, 0 to 0.20, 0.01 to 0.20, 0.01 to 0.18, 0.01 to 0.16, 0.01 to 0.15, 0.02 to 0.20, 0.02 to 0.18, 0.02 to 0.16, 0.02 to 0.15, 0.03 to 0.20, 0.03 to 0.19, 0.03 to 0.15, 0.03 to 0.12, 0.05 to 0.19, or 0.05 to 0.15. Without intending to be bound by theory, it is believed that as the amount of metal dopant in the alpha-demetallated nickel oxide increases, the stability of an electrochemically active material including the alpha-demetallated nickel oxide to an aqueous alkali metal hydroxide solution, such as an alkaline battery electrolyte, increases but the total discharge capacity can decrease, for example, when the dopant metal is not electrochemically active in the same voltage window as nickel.

Methods of Preparing an Electrochemically Active Cathode Material

In general, the methods of preparing an electrochemically active cathode material includes combining an alkali metal-containing nickel oxide having a general formula $A_{1-a}Ni_{1+a}$ $O_2$, wherein A comprises an alkali metal and $0 < a \leq 0.2$ with a fluid composition (e.g., a suspension, dispersion, or solution) including an oxidant comprising a peroxydisulfate salt, a monopersulfate salt, or a combination thereof to form a mixture (e.g., a suspension, dispersion, or solution), heating the mixture to a temperature of 50° C. or greater, and maintaining the mixture at the temperature for at least a period of time sufficient to form an alpha-demetallated nickel oxide electrochemically active cathode material.

The oxidant is a chemical oxidant and can include a peroxydisulfate salt, a monopersulfate salt, or a combination thereof. The terms peroxydisulfate and persulfate are used interchangeably herein. In embodiments, the oxidant comprises a peroxydisulfate salt. In embodiments, the oxidant comprises a monopersulfate salt. In embodiments, the oxidant comprises a combination of a peroxydisulfate salt and a monopersulfate salt. The peroxydisulfate and monopersulfate salts are generally water-soluble. As used herein, "water-soluble" means that at least about 10 mg of peroxydisulfate salt or monopersulfate salt is soluble in 1 ml of water at 25° C. The peroxydisulfate salt, monopersulfate salt, or both can include a counter cation selected form the group consisting of sodium, potassium, lithium, ammonium, or a combination thereof. In embodiments, the counter cation of the oxidant includes a sodium cation. In embodiments, the counter cation of the oxidant includes a potassium cation. In embodiments, the counter cation of the oxidant comprises two different cations selected from the group consisting of ammonium, sodium, and potassium. In embodiments, the oxidant is a peroxydisulfate salt and the counter cation is selected from the group consisting of ammonium, sodium, potassium, lithium, and a combination thereof. In embodiments, the oxidant is a peroxydisulfate salt and the counter cation comprises two different counter cations selected from the group consisting of ammonium, sodium, and potassium. In embodiments, the oxidant is a peroxydisulfate salt and the counter cation comprises sodium. In embodiments, the oxidant is a peroxydisulfate salt and the counter cation comprises potassium. In embodiments, the oxidant is a peroxydisulfate salt and the counter cation comprises ammonium. In embodiments, the oxidant comprises peroxydisulfate salt and the peroxydisulfate salt is a combination of a sodium peroxydisulfate salt and a potassium peroxydisulfate salt. Other water soluble oxidizing agents include alkali metal (e.g., sodium, potassium) permanganates, alkali (e.g., lithium, sodium, potassium) metal hypochlorites, alkaline earth (e.g., calcium) metal hypochlorites, and alkali metal (e.g., potassium) ferrates.

The alkali metal-containing nickel oxide and the oxidant can be provided in a molar ratio of about 1:0.75 to about 1:2, for example, about 1:0.75 to about 1:2, about 1:0.8 to about 1:2, about 1:0.9 to about 1:2, about 1:1 to about 1:2, about 1:0.75 to about 1:1.25, about 1:0.75 to about 1:1.1, about 1:0.75 to about 1:1, about 1:1.1 to about 1:2, about 1:1.2 to about 1:2, about 1:1.25 to about 1:2, about 1:1.3 to about 1:2, about 1:1.4 to about 1:2, about 1:1.5 to about 1:2, about 1:1.6 to about 1:2, about 1:1.7 to about 1:2, about 1:1.75 to about 1:2, about 1:1.8 to about 1:2, or about 1:9 to about 1:2. In general, without intending to be bound by theory, it is believed that each peroxydisulfate dianion can form two sulfate radical anions.

Further, without intending to be bound by theory, it is believed that each sulfate radical anion can accept 1 electron to form a sulfate dianion and, therefore, each mole of peroxydisulfate salt could theoretically oxidize two moles of alkali metal-containing layered nickel oxide. Thus, as the amount of peroxydisulfate oxidant relative to the amount of alkali metal-containing nickel oxide increases, the rate of demetallation of the alkali metal-containing nickel oxide at a given temperature can increase; however, the amount of persulfate available for decomposition to sulfuric acid also increases, and thus the likelihood of disproportionation of the nickel compound to soluble Ni(II) increases. On the other hand, without intending to be bound by theory, it is believed that a small amount of excess oxidant (e.g., provided in an amount greater than a 1:1 molar ratio) can be advantageous to allow a small amount of competing disproportionation reaction to occur to facilitate the conversion of the Ni(Ill) in the alkali metal-containing nickel oxide to Ni(IV) to form alkali metal-deficient nickel oxide. Thus, in embodiments, the alkali metal-containing nickel oxide and the oxidant can be provided in a molar ratio of about 1:0.75 to about 1:2, for example, about 1:1.1 to about 1:2, about 1:1.2 to about 1:2, about 1:1.25 to about 1:2, about 1:1.25 to about 1:1.9, about 1:1.25 to about 1:1.8, about 1:1.25 to about 1:1.6, about 1:1.25 to about 1:1.5, about 1:1.3 to about 1:2, about 1:1.3 to about 1:1.9, about 1:0.75 to about 1:1.5, about 1:0.75 to about 1:1.25, about 1:0.75 to about 1:1, about 1:0.75 to about 1:1, about 1:0.8 to about 1:1.3, about 1:0.8 to about 1:1.1, or about 1:0.9 to about 1:1.1. In embodiments, the alkali metal-containing nickel oxide and the oxidant can be provided in a molar ratio of about 1:1.2 to about 1:1.5. In embodiments, the alkali metal-containing nickel oxide and the oxidant can be provided in a molar ratio of about 1:0.75 to about 1:1.2.

Without intending to be bound by theory, while it is believed that some thermal decomposition of the oxidant to provide sulfuric acid can be advantageous to promote a small amount of disproportionation of the nickel oxide to provide a Ni(IV) material which has a high discharge capacity, the addition of such an acid should be limited because the disproportionation reaction is detrimental to the yield and because the Ni(II) resulting from the disproportionation reaction can catalyze further decomposition of the oxidant. Accordingly, in embodiments, the method does not include addition of a solution of mineral acid, such as sulfuric acid, to the fluid composition.

The fluid composition comprising the oxidant can be any fluid composition which allows the oxidant to react with the alkali metal-containing nickel oxide. The fluid composition can be, for example, an aqueous solution, a suspension, a slurry or other mixture of the oxidant and water and the alkali-metal containing nickel oxide. Without intending to be bound by theory, it is believed that the solubility of the oxidant in the fluid composition affects the rate of the oxidative demetallation reaction as well as the thermal stability of the oxidant. In embodiments, the fluid composition comprises water. In embodiments, the fluid composition comprises an aqueous solution of the oxidant. In embodiments, the fluid composition comprises a suspension of the oxidant, for example, in which the oxidant is poorly soluble or super-saturated. In embodiments, the fluid composition comprises water and the oxidant is soluble in water at temperature of about 25° C. In embodiments, the fluid composition comprises water and the oxidant is soluble in water at a temperature of about 45° C., at a temperature of about 50° C. In embodiments, the fluid composition comprises water and the oxidant is at least partially soluble in water at a temperature of about 25° C. In embodiments, the fluid composition comprises water and the oxidant is at least partially soluble in water at a temperature of about 45° C., at a temperature of about 50° C. In embodiments, the fluid composition comprises water and the peroxydisulfate salt comprises sodium peroxydisulfate. In embodiments, the fluid composition comprises water and the peroxydisulfate salt comprises ammonium peroxydisulfate. In embodiments, the fluid composition comprises water and the peroxydisulfate salt comprises potassium peroxydisulfate.

In general, the order of operations for combining the alkali metal-containing nickel oxide and the oxidant is non-limiting. In embodiments, the alkali metal-containing nickel oxide is added to the fluid composition including the oxidant. In embodiments, the fluid composition including the oxidant is added to the alkali metal-containing nickel oxide. In embodiments, the mixture is prepared and then heated to a temperature of 50° C. or greater. In refinements of the foregoing embodiment, the mixture can be heated at a rate of about 1° C. per minute. In embodiments, the mixture can be heated to a temperature in a range of about 50° C. to about 85° C., for example, about 50° C. to about 85° C., about 60° C. to about 80° C., or about 60° C., about 65° C., about 70° C., about 75° C., about 80° C., or about 85° C. In embodiments, the mixture is heated to about 55° C. to about 65° C., for example, about 60° C. In embodiments, the mixture is heated to about 75° C. to about 85° C., or about 80° C. to about 85° C. In embodiments, the mixture is heated to about 55° C. to about 85° C. In embodiments, the mixture is heated to about 60° C. to about 80° C. In embodiments, the mixture is heated to about 65° C. to about 85° C. In embodiments, the mixture is heated to about 70° C. to about 80° C.

In general, the time sufficient to form an alpha-demetallated nickel oxide electrochemically active cathode material is any time which allows at least about 50%, about 55%, about 60%, about 60%, about 70%, about 75%, about 80%, or about 85% or the alkali metal-containing nickel oxide to convert to the alpha-demetallated nickel oxide. In embodiments, the time sufficient to form an alpha-demetallated nickel oxide can depend on the temperature of the fluid composition.

In embodiments, the alpha-demetallated nickel oxide electrochemically active cathode material is formed in a product yield of greater than about 50 wt. %, based on the weight of the starting alkali metal-containing nickel oxide, for example, in a range of greater than about 50 wt. % to about 95%, about 50 wt. % to about 90%, about 50 wt. % to about 85%, about 55% to about 80%, about 60% to about 80%, about 60% to about 75%, about 65% to about 80%, about 65% to about 75%, or about 70% to about 89%. In embodiments, the alpha-demetallated nickel oxide electrochemically active cathode material is formed in a product yield of greater than about 55 wt. %, based on the weight of the starting alkali metal-containing nickel oxide. In embodiments, the alpha-demetallated nickel oxide electrochemically active cathode material is formed in a product yield of greater than about 60 wt. %, based on the weight of the starting alkali metal-containing nickel oxide. In embodiments, the alpha-demetallated nickel oxide electrochemically active cathode material is formed in a product yield of greater than about 70 wt. %, based on the weight of the starting alkali metal-containing nickel oxide. In embodiments, the alpha-demetallated nickel oxide electrochemically active cathode material is formed in a product yield of greater than about 70 wt. % to about 80 wt. %, based on the weight of the starting alkali metal-containing nickel oxide.

Advantageously, the methods of the disclosure provide a demetallation process having relatively short treatment times in order to enable production of demetallated layered alkali nickel oxides in high yield with high discharge capacity, e.g., about 420 mAh/g or more when discharged at a relatively low discharge rate (about C/30 or C/40) as the cathode active material in an alkaline zinc electrochemical cell. In embodiments, the time sufficient to form the alpha-demetallated nickel oxide can be about 1 hour to about 24 hours. In embodiments, the time sufficient to form the alpha-demetallated nickel oxide can be about 1 hour to about 12 hours. In embodiments, the time sufficient to form the alpha-demetallated nickel oxide can be about 1 hour to about 6 hours. In embodiments, the time sufficient to form the alpha-demetallated nickel oxide can be about 4 hour to about 12 hours. In embodiments, the time sufficient to form the alpha-demetallated nickel oxide can be about 2 hour to about 6 hours. In embodiments, the time sufficient to form the alpha-demetallated nickel oxide can be about 1 hour to about 5 hours. In embodiments, the time sufficient to form the alpha-demetallated nickel oxide can be about 2 hour to about 4 hours.

In embodiments, the mixture can be heated to a temperature of about 60° C. to about 80° C. for about 1 to about 24 hours. In embodiments, the mixture can be heated to a temperature of about 65° C. to about 85° C. for about 1 to about 12 hours. In embodiments, the mixture can be heated to a temperature of about 70° C. to about 80° C. for about 4 to 12 hours.

Without intending to be bound by theory, it is believed that the stability of the peroxydisulfate salt and monopersulfate salt to thermal decomposition increases when the pH of the fluid composition is basic and maintained in the range of 8 to 12. Thus, in embodiments, the fluid composition has a pH in a range of about 8 to 12, for example, about 8 to about 11, about 8 to about 10, about 8 to about 9, about 9 to about 12, about 9 to about 11, about 9 to about 10, about 10 to about 12, about 10 to about 11, or about 11 to about 12. Without intending to be bound by theory, it is further believed that when the fluid composition has a pH in a range of about 8 to about 12, any sulfuric acid formed from thermal decomposition of the oxidant is neutralized before it can promote significant disproportionation of the alkali-metal containing nickel oxide and solubilizing of Ni(II) ions. The pH of the fluid composition can be adjusted by including an alkali metal hydroxide or ammonium hydroxide in the composition. Thus, in some embodiments, the fluid composition further comprises an alkali metal hydroxide, an ammonium hydroxide, or a combination thereof.

In embodiments, the alkali metal-containing nickel oxide, the oxidant, and the hydroxide salt can be provided in a molar ratio of about 1:1.5:1 to about 1:2:6, for example, 1:1.5:1, 1:1.5:2, 1:2:2, 1:2:3, 1:2:4, 1:2:5, or 1:2:6. In embodiments, the molar ratio of the alkali metal-containing nickel oxide, the oxidant, and the hydroxide salt can be about 1:1.5:1 to about 1:2:6. In embodiments, the molar ratio of the alkali metal-containing nickel oxide, the oxidant, and the hydroxide salt can be about 1:1.5:1 to about 1:1.5:2. In embodiments, the molar ratio of the alkali metal-containing nickel oxide, the oxidant, and the hydroxide salt can be about 1:1.15:2 to 1:2:2. In embodiments, the molar ratio of the alkali metal-containing nickel oxide, the oxidant, and the hydroxide salt can be about 1:1.5:3 to about 1:2:3. In embodiments, the molar ratio of the alkali metal-containing nickel oxide, the oxidant, and the hydroxide salt can be about 1:2:2 to about 1:2:3. In embodiments, the molar ratio of the alkali metal-containing nickel oxide, the oxidant, and the hydroxide salt can be about 1:0.75:1 to about 1:2:6. In embodiments, the molar ratio of the alkali metal-containing nickel oxide, the oxidant, and the hydroxide salt can be about 1:0.75:1 to about 1:0.75:2. In embodiments, the molar ratio of the alkali metal-containing nickel oxide, the oxidant, and the hydroxide salt can be about 1:0.75:1 to about 1:2:2. In embodiments, the molar ratio of the alkali metal-containing nickel oxide, the oxidant, and the hydroxide salt can be about 1:0.75:1 to about 1:0.75:3. In embodiments, the molar ratio of the alkali metal-containing nickel oxide, the oxidant, and the hydroxide salt can be about 1:0.75:3 to about 1:2:3. In general, the amount of hydroxide can be increased as the amount of oxidant is increased in order to increase the amount of base available to neutralize any sulfuric acid formed, as desired.

In general, the hydroxide salt can include a counter cation selected from the group consisting of ammonium, sodium, potassium, lithium, and a combination thereof. In embodiments, the counter cation of the oxidant and the counter cation of the hydroxide salt are the same. In embodiments, the oxidant is a peroxydisulfate salt and the counter cation of the peroxydisulfate salt and the hydroxide salt are the same. In embodiments, the counter cation of the oxidant and the counter cation of the hydroxide salt are not the same. Without intending to be bound by theory, it is believed that the selection of counter cation of the hydroxide salt can affect the rate and yield of the conversion of the alkali metal-containing nickel oxide to the alpha-demetallated nickel oxide as a result of the solubility of the hydroxide salt and/or the oxidant in the fluid composition, in the presence of the counter cation of the hydroxide salt. For example, for a given counter cation, while the hydroxide salt may be soluble in the fluid composition, dissolved oxidant may form a salt with the free counter cation of the hydroxide salt and the formed salt can have lower to no solubility in the fluid composition, resulting in the precipitation of the oxidant, thereby lowering the yield of the alkali metal-containing nickel oxide. Thus, in embodiments, the counter cation of the hydroxide is selected such that a salt formed between the counter cation of the hydroxide and the peroxydisulfate or monopersulfate anion is at least partially soluble in the fluid composition.

In embodiments, the counter cation of the oxidant and the counter cation of the hydroxide are the same and the counter cation comprises ammonium. In embodiments, the counter cation of the hydroxide comprises ammonium. In embodiments, the counter cation of the hydroxide salt comprises sodium. In embodiments, the counter cation of the hydroxide salt comprises potassium. In embodiments, the counter cation of the hydroxide salt comprises sodium and potassium. In embodiments, the counter cation of the hydroxide salt comprises two different counter cations selected from the group consisting of ammonium, sodium, and potassium. In embodiments, one of the counter cation of the oxidant and the hydroxide salt comprises ammonium and the other comprises potassium. In embodiments, the oxidant comprises peroxydisulfate salt and one of the counter cation of the peroxydisulfate salt and the hydroxide salt comprises ammonium and the other comprises potassium. In embodiments, one of the counter cation of the oxidant and the hydroxide salt comprises ammonium and the other comprises sodium. In embodiments, the oxidant comprises peroxydisulfate salt and one of the counter cation of the peroxydisulfate salt and the hydroxide salt comprises ammonium and the other comprises sodium. In embodiments, the oxidant comprises peroxydisulfate salt and neither the counter cation of the peroxydisulfate salt nor the counter cation of the hydroxide salt comprises ammonium. That is, in embodiments, the fluid composition is substantially free of ammonium cations. As used herein, and unless specified otherwise, "substantially free of ammonium cations" means that the fluid composition includes less than about 1 wt. %, less than about 0.05 wt. %, or less than about 0.01 wt. % of ammonium cations, based on the total weight of the fluid composition.

In some embodiments, the fluid composition is substantially free of a hydroxide salt. As used herein, and unless provided otherwise, "substantially free of a hydroxide salt" means that the fluid composition includes less than about 5 wt. %, less than about 3 wt. %, or less than about 1 wt. % of a hydroxide salt, based on the total weight of the fluid composition.

In embodiments, the counter cation of the peroxydisulfate salt comprises ammonium and the fluid composition is substantially free of a hydroxide salt. In embodiments, the counter cation of the peroxydisulfate salt comprises sodium and the fluid composition is substantially free of a hydroxide salt.

In embodiments, the alpha-demetallated nickel oxide can have a purity of greater than 80%, for example in a range of greater than about 80% and up to about 100%, greater than about 85% to about 100%, greater than about 90% to about 100%, greater than about 95% to about 100%, about 85% to about 100%, about 90% to about 100%, or about 85%, about 90%, about 95%, or greater than about 95%.

The method can further include treating the alpha-demetallated nickel oxide with an aqueous solution of an alkali metal hydroxide to form the stabilized beta-demetallated nickel oxide having a second, different alkali metal inserted into the layers thereof, according to the formula $A_x A'_v Ni_{1+a} O_2 \cdot n H_2O$, wherein A includes Li or Na; A' includes K, Cs, or Rb; $0.04 \leq x < 0.2$; $0.03 < v < 0.20$; $0.02 < a \leq 0.2$; and $0 < n < 2$. In embodiments, the alpha-demetallated nickel oxide can be doped with a metal, M, such that the resulting beta-demetallated nickel oxide has a formula $A_x A'_v Ni_{1+a-z} M_z O_2 \cdot n H_2O$, wherein A comprises Li or Na, $0 < x \leq 0.2$, A' comprises K, Cs, or Rb, $0.03 < v < 0.20$, M comprises a transition metal or main group metal, $0 \leq z \leq 0.2$, $0.02 < a$ s 0.2, and $0 < n < 2$.

In general, A can be Li or Na. In embodiments, A comprises Li. In general, A' can be K, Rb or Cs, and A' and A are different. In embodiments, A' comprises K. In embodiments, A' comprises Rb or Cs, or a combination thereof. In embodiments, A comprises Li and A' comprises K. In embodiments, x can be in a range of 0.04 to 0.2, for example, 0.04 to 0.18, 0.04 to 0.16, 0.04 to 0.15, 0.08 to 0.2, for example, 0.08 to 0.18, 0.08 to 0.16, 0.08 to 0.15, 0.09 to 0.20, 0.09 to 0.19, 0.09 to 0.15, 0.09 to 0.12, 0.10 to 0.19, or 0.10 to 0.15. In embodiments, v can be in a range of 0.03 to 0.20, for example, 0.03 to 0.17, 0.03 to 0.15, 0.03 to 0.13, 0.06 to 0.20, 0.06 to 0.17, 0.06 to 0.15, 0.06 to 0.13, 0.08 to 0.17, 0.08 to 0.15, or 0.08 to 0.13. In embodiments, a can be in a range of $0.02 \leq a \leq 0.20$, for example 0.02 to 0.18, 0.02 to 0.16, 0.03 to 0.20, 0.03 to 0.17, 0.03 to 0.15, 0.04 to 0.20, 0.04 to 0.17, 0.04 to 0.15, 0.04 to 0.13, or 0.04 to 0.11. In embodiments, n can be in a range of $0 < n < 2$, for example, about 0.01 to about 1.9, about 0.02 to about 1.8, about 0.05 to about 1.8, about 0.05 to about 1.5, about 0.05 to about 1.25, about 0.05 to about 1.0, about 0.1 to about 1.8, about 0.1 to about 1.5, about 0.1 to about 1.25, about 0.1 to about 1.0, about 0.15 to about 1.8, about 0.15 to about 1.5, about 0.15 to about 1.25, about 0.15 to about 1, about 0.15 to about 0.8, about 0.15 to about 0.75, about 0.15 to about 0.7, or about 0.15 to about 0.6. In embodiments, z can have a value in a range of $0 \leq z \leq 0.2$, for example, 0 to 0.20, 0.01 to 0.20, 0.01 to 0.18, 0.01 to 0.16, 0.01 to 0.15, 0.02 to 0.20, 0.02 to 0.18, 0.02 to 0.16, 0.02 to 0.15, 0.03 to 0.20, 0.03 to 0.19, 0.03 to 0.15, 0.03 to 0.12, 0.05 to 0.19, or 0.05 to 0.15.

The aqueous solution of an alkali hydroxide is not particularly limited and can be selected from a potassium salt solution, a rubidium salt solution, a cesium salt solution, or any combination thereof. The concentration of alkali metal salt in the alkaline solution can be any concentration sufficient to achieve substantially complete conversion of the alpha-demetallated layered nickel oxide to the beta-demetallated nickel oxide. As used herein, and unless specified otherwise, "substantially complete conversion" refers to conversion of the alpha-demetallated nickel oxide to the beta-demetallated nickel oxide wherein residual alpha-demetallated nickel oxide is present in an amount of 5 wt. % or less, based on the total weight of the nickel oxide materials. In some embodiments, the concentration of alkali metal hydroxide in the solution can be in a range of about 0.5M to about 10M, about 1 M to about 10M, about 3M to about 9M, or about 5M to about 8.75M. In some embodiments, the alkali metal hydroxide solution includes at least one of potassium hydroxide, cesium hydroxide and rubidium hydroxide, provided at a concentration of about 0.5M to about 10M. The alpha-demetallated nickel oxide can be provided as a free-flowing powder when combined with the alkali metal hydroxide solution. The alpha-demetallated nickel oxide powder and alkali metal hydroxide solution can be combined in a weight ratio of about 10:1 to about 1:5, about 9:1 to about 1:4, about 8:1 to about 1:3, about 7:1 to about 1:2, about 6:1 to about 1:2, about 5:1 to about 1:2, or about 4:1 to about 1:2, or about 3:1 to about 1:1, for example, about 3:1, about 2:1, or about 1:1.

The alpha-demetallated nickel oxide can be treated with the alkali metal hydroxide solution for a period of time sufficient to ensure that the alpha-demetallated nickel oxide is fully converted to the beta-demetallated nickel oxide. The alpha-demetallated nickel oxide and alkali metal hydroxide solution can be agitated initially for 5 to 15 minutes at ambient temperature to ensure adequate mixing and wetting. Following mixing of the alpha-demetallated nickel oxide and the alkali metal hydroxide solution, the mixture is held at ambient temperature for 2 to 24 hours. Optionally, the mixture can be stirred during the 2 to 24 hour period. After the 2 to 24 hours, the resulting beta-demetallated nickel oxide can optionally be washed with water to remove any residual alkali metal hydroxide. Substantially complete conversion to the beta-demetallated nickel oxide can be confirmed by analyzing the powder X-ray diffraction pattern of the resulting material. For example, for alpha-delithiated nickel oxide treated with a potassium hydroxide solution, as the potassium ion and water molecules from the potassium hydroxide solution insert into layers of the alpha-delithiated nickel oxide, the intensity of a diffraction peak located at about 18° to 20°2θ in the X-ray diffraction pattern of the alpha-delithiated nickel oxide decreases and very broad peaks appear in the X-ray diffraction pattern of the beta-delithiated layered nickel oxide at about 14.9° to about 16.0°2θ, and about 21.3° to about 22.7° 2θ. Thus, at full conversion to the beta-delithiated nickel oxide, the powder X-ray diffraction pattern will have broad diffraction peaks at about 10.8° to about 12.0°2θ, about 14.9° to about 16.0°2θ, about 21.3° to about 22.7° 2θ, and about 25.3° to about 27.5°2θ having greater intensities than in the powder X-ray diffraction pattern of the alpha-delithiated nickel oxide precursor, and there will be no diffraction peak having significant intensity in the range of about 18° to 20° 2θ. The resulting beta-demetallated nickel oxide can be washed repeatedly with deionized water until the pH of the filtrate from washing is about 10. The solid powder can be collected and dried in air at about 70° C. for a period of about 12 to 20 hours.

In embodiments, treating the alpha-demetallated nickel oxide with an aqueous solution of an alkali metal hydroxide, wherein the alkali metal is different from that of the alpha-demetallated nickel oxide, forms about 10% or less, by weight, of gamma-nickel oxyhydroxide ($\gamma$-NiOOH) as a side product, based on the total weight of the reaction products, for example, about 8% or less, about 6% or less, about 5% or less, about 4% or less, about 3% or less, about 2% or less, about 1% or less, based on the total weight of the solid reaction products. In embodiments, treating the alpha-demetallated nickel oxide with an aqueous solution of an alkali metal hydroxide can form less than about 6% by weight of gamma-nickel oxyhydroxide ($\gamma$-NiOOH) as a reaction side product.

Batteries

Electrochemical cells, or batteries, may be primary or secondary. Primary batteries are meant to be discharged, e.g., to exhaustion, only once and then discarded. Primary batteries are described, for example, in David Linden, Handbook of Batteries (4th ed. 2011). Secondary batteries are intended to be recharged. Secondary batteries may be discharged and recharged many times, e.g., more than fifty times, a hundred times, or more. Secondary batteries are described, for example, in David Linden, Handbook of Batteries (4th ed. 2011). Accordingly, batteries may include various electrochemical couples and electrolyte combinations. Although the description and examples provided herein are generally directed towards primary alkaline electrochemical cells, or batteries, it should be appreciated that the invention applies to both primary and secondary batteries having aqueous, nonaqueous, ionic liquid, and solid state electrolyte systems. Primary and secondary batteries including the aforementioned electrolytes are thus within the scope of this application and the invention is not limited to any particular embodiment.

Referring to FIG. 1, there is shown a primary alkaline electrochemical cell, or battery, 10 including a cathode 12, an anode 14, a separator 16, and a housing 18. Battery 10 also includes a current collector 20, a seal 22, and an end cap 24. The end cap 24 serves as the negative terminal of the battery 10. A positive pip 26 is at the opposite end of the battery 10 from the end cap 24. The positive pip 26 may serve as the positive terminal of the battery 10. An electrolytic solution is dispersed throughout the battery 10. The cathode 12, anode 14, separator 16, electrolyte, current collector 20, and seal 22 are contained within the housing 18. Battery 10 can be, for example, a AA, AAA, AAAA, C, or D size alkaline battery.

The housing 18 can be of any conventional type of housing commonly used in primary alkaline batteries and can be made of any suitable base material, for example cold-rolled steel or nickel-plated cold-rolled steel. The housing 18 may have a cylindrical shape. The housing 18 may be of any other suitable, non-cylindrical shape. The housing 18, for example, may have a shape comprising at least two parallel plates, such as a rectangular, square, or prismatic shape. The housing 18 may be, for example, deep-drawn from a sheet of the base material, such as cold-rolled steel or nickel-plated steel. The housing 18 may be, for example, drawn into a cylindrical shape. The housing 18 may have at least one open end. The housing 18 may have a closed end and an open end with a sidewall therebetween. The interior surface of the sidewall of the housing 18 may be treated with a material that provides a low electrical-contact resistance between the interior surface of the sidewall of the housing 18 and an electrode, such as the cathode 12. The interior surface of the sidewall of the housing 18 may be plated, e.g., with nickel, cobalt, and/or painted with a carbon-loaded paint to decrease contact resistance between, for example, the internal surface of the sidewall of the housing 18 and the cathode 12.

The cathode 12 includes at least one electrochemically active cathode material. The electrochemically active cathode material can include an alpha-demetallated layered nickel oxide and/or a non-stoichiometric beta-delithiated layered nickel oxide prepared according to methods of the disclosure. In embodiments, when a non-stoichiometric beta-delithiated layered nickel oxide is provided as a electrochemically active cathode material, the non-stoichiometric beta-delithiated layered nickel oxide comprises less than 5 wt. %, less than 3 wt %, less than 1 wt %, or less than 0.5 wt % residual non-stoichiometric alpha-delithiated layered nickel oxide, based on the total weight of the delithiated layered nickel oxide electrochemically active cathode material. Similarly, a cell that includes a non-stoichiometric beta-delithiated layered nickel oxide, as described herein, is provided with the non-stoichiometric beta-delithiated layered nickel oxide ab initio.

The cathode 12 may also include at least one or more additional electrochemically active cathode materials. The additional electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, and any combination thereof. Other electrochemically active cathode materials include, but are not limited to, silver oxide; nickel oxide, nickel oxyhydroxide; copper oxide; silver copper oxide; silver nickel oxide; bismuth oxide; oxygen; and any combination thereof. The nickel oxyhydroxide can include beta-nickel oxyhydroxide, gamma-nickel oxyhydroxide, intergrowths of beta-nickel oxyhydroxide and/or gamma-nickel oxyhydroxide, and cobalt oxyhydroxide-coated nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide.

In embodiments, the electrochemically active material of cathode 12 comprises at least 10 wt. %, at least 15 wt. %, at least 20 wt. %, at least 25. wt %, at least 30 wt. %, at least 35 wt. %, at least 40 wt. %, at least 45 wt. %, at least 50 wt. %. at least 55 wt. %, at least 60 wt. %, at least about 70 wt. %, or at least about 75 wt. %, of the non-stoichiometric beta-delithiated layered nickel oxide, based on the total weight of the electrochemically active cathode material, for example, in a range of about 10 wt. % to about 90 wt. %, about 10 wt. % about 20 wt. % to about 70 wt. %, about 30 wt. % to about 60 wt. %, about 40 wt. % to about 60 wt. %, or about 50 wt. %, based on the total weight of the electrochemically active cathode material. In embodiments, the electrochemically active material of cathode 12 comprises about 40 wt. % to about 60 wt. % of the non-stoichiometric beta-delithiated nickel oxide, based on the total weight of the electrochemically active cathode material and about 60 wt. % to about 40 wt. % of one or more of manganese oxide, manganese dioxide, electrolytic manganese dioxide (EMD), chemical manganese dioxide (CMD), high power electrolytic manganese dioxide (HP EMD), lambda manganese dioxide, or gamma manganese dioxide, based on the total weight of the electrochemically active cathode material. A combination of between about 10 wt. % and about 60 wt. %, for example, 20 wt. % or 50 wt. %, of the non-stoichiometric beta-delithiated layered nickel oxide with the balance of the electrochemically active cathode material comprising electrolytic manganese dioxide (EMD) has been found to provide unexpectedly advantageous battery performance in both high discharge rate applications and low rate discharge applications.

The cathode 12 may include a conductive additive, such as carbon, and optionally, a binder. The cathode 12 may also include other additives. The carbon may increase the conductivity of the cathode 12 by facilitating electron transport within the solid structure of the cathode 12. The carbon may be graphite, such as natural graphite, synthetic graphite, oxidation resistant graphite, graphene, single-walled carbon nanotubes, multi-walled carbon nanotubes, carbon fibers, carbon nanofibers, carbon nanoribbons, carbon nanoplatelets, and mixtures thereof. It is preferred that the amount of carbon in the cathode is relatively low, e.g., less than about 12%, less than about 10%, less than about 9%, less than about 8%, less than about 6%, less than about 5% less than about 3.75%, or even less than about 3.5%, for example from about 3.0% to about 5% by weight or from about 2.0% to about 3.5% by weight. The lower carbon level can enable inclusion of a higher loading of electrochemically active cathode material within the cathode 12 without increasing the volume of the cathode 12 or reducing the void volume (which must be maintained at or above a certain level to prevent internal pressure from rising too high as gas is generated within the cell) within the battery 10. Suitable graphite for use within a battery, e.g., within the cathode, may be, for example, Timrex MX-15, SFG-15, MX-25, all available from Imerys Graphite and Carbon (Bodio, Switzerland). In the case of a highly reactive cathode active material such as non-stoichiometric beta-delithiated layered nickel oxide, an oxidation-resistant graphite, for example, SFG-15, SFG-10, and SFG-6, can be used.

The cathode 12 can include an optional binder. As used herein, "binder" refers to a polymeric material that provides cathode cohesion and does not encompass graphite. Examples of optional binders that may be used in the cathode 12 include polyethylene, polyacrylic acid, or a fluorocarbon resin, such as PVDF or PTFE. An optional binder for use within the cathode 12 may be, for example, COATHYLENE HA-1681, available from E. I. du Pont de Nemours and Company (Wilmington, DE, USA). Examples of other cathode additives are described in, for example, U.S. Pat. Nos. 5,698,315, 5,919,598, 5,997,775 and 7,351, 499. In some embodiments, the cathode 12 is substantially free of a binder. As used herein, "substantially free of a binder" means that the cathode includes less than about 5 wt. %, less than about 3 wt. %, or less than about 1 wt. % of a binder.

The content of electrochemically active cathode material within the cathode 12 may be referred to as the cathode loading. The loading of the cathode 12 may vary depending upon the electrochemically active cathode material used within, and the size of, the battery 10. For example, a AA battery with a beta-delithiated layered nickel oxide as the electrochemically active cathode material may have a cathode loading of at least about 6 grams of beta-delithiated layered nickel oxide. The cathode loading may be, for example, at least about 7 grams of non-stoichiometric beta-delithiated layered nickel oxide. The cathode loading may be, for example, between about 7.2 grams to about 11.5 grams of non-stoichiometric beta-delithiated layered nickel oxide. The cathode loading may be from about 8 grams to about 10 grams of non-stoichiometric beta-delithiated layered nickel oxide. The cathode loading may be from about 8.5 grams to about 9.5 grams of non-stoichiometric beta-delithiated layered nickel oxide. The cathode loading may be from about 9.5 grams to about 11.5 grams of non-stoichiometric beta-delithiated layered nickel oxide. The cathode loading may be from about 10.4 grams to about 11.5 grams of non-stoichiometric beta-delithiated layered nickel oxide. For a AAA battery, the cathode loading may be at least about 3 grams of non-stoichiometric beta-delithiated layered nickel oxide electrochemically active cathode material. The cathode loading may be from about 3 grams to about 5 grams of non-stoichiometric beta-delithiated layered nickel oxide. The cathode loading may be from about 3.5 grams to about 4.5 grams of non-stoichiometric beta-delithiated layered nickel oxide. The cathode loading may be from about 3.9 grams to about 4.3 grams of non-stoichiometric beta-delithiated layered nickel oxide. For a AAAA battery, the cathode loading may be from about 1.5 grams to about 2.5 grams of non-stoichiometric beta-delithiated layered nickel oxide electrochemically active cathode material. For a C battery, the cathode loading may be from about 27.0 grams to about 40.0 grams, for example about 33.5 grams, of non-stoichiometric beta-delithiated layered nickel oxide electrochemically active cathode material. For a D battery, the cathode loading may be from about 60.0 grams to about 84.0 grams, for example about 72.0 grams, of non-stoichiometric beta-delithiated layered nickel oxide electrochemically active cathode material.

The cathode components, such as active cathode material (s), carbon particles, binder, and any other additives, may be combined with a liquid, such as an aqueous potassium hydroxide electrolyte, blended, and pressed into pellets for use in the assembly of the battery 10. For optimal cathode pellet processing, it is generally preferred that the cathode pellet have a moisture level in the range of about 2% to about 5% by weight, or about 2.8% to about 4.6% by weight. The pellets, are placed within the housing 18 during the assembly of the battery 10, and are typically re-compacted to form a uniform cathode assembly within the housing 18. The cathode pellet may have a cylindrical shape that includes a central bore. The size of the pellet may vary by the size of the battery, for example AA size, AAA size, AAAA size, C size, and D size, that the pellet will be used within. The central bore may define an inside diameter (ID) of the pellet. The inside diameter of the pellet for a AA battery may be, for example, from about 9.1 mm to about 9.9 mm. The inside diameter of the pellet for a AA battery may be, for example, from about 9.3 mm to about 9.7 mm. The inside diameter of the pellet for a AAA battery may be, for example, from about 6.6 mm to about 7.2 mm. The inside diameter of the pellet for a AAA battery may be, for example, from about 6.7 mm to about 7.1 mm. The inside diameter of the pellet for a AAAA battery may be, for example, from about 5 mm to about 5.5 mm. The inside diameter of the pellet for a C battery may be, for example, from about 16 mm to about 19 mm. The inside diameter of the pellet for a D battery may be, for example, from about 21 mm to about 25 mm.

The cathode 12 will have a porosity that may be calculated at the time of cathode manufacture. The porosity of the cathode 12 may be from about 20% to about 40%, between about 22% and about 35%, and, for example, about 26%. The porosity of the cathode 12 may be calculated at the time of manufacturing, for example after cathode pellet processing, since the porosity of the cathode 12 within the battery 10 may change over time due to, inter alia, cathode swelling associated with electrolyte wetting of the cathode and discharge of the battery 10. The porosity of the cathode 12 may be calculated as follows. The true density of each solid cathode component may be taken from a reference book, for example Lange's Handbook of Chemistry (16th ed. 2005). The solids weight of each of the cathode components are defined by the battery design. The solids weight of each cathode component may be divided by the true density of each cathode component to determine the cathode solids volume. The volume occupied by the cathode 12 within the battery 10 is defined, again, by the battery design. The volume occupied by the cathode 12 may be calculated by a computer-aided design (CAD) program. The porosity may be determined by the following formula:

$$\text{Cathode Porosity} = [1-(\text{cathode solids volume} \div \text{cathode volume})] \times 100$$

For example, the cathode 12 of a AA battery may include about 9.0 grams of non-stoichiometric beta-delithiated layered nickel oxide and about 0.90 grams of graphite (BNC-30) as solids within the cathode 12. The true densities of the non-stoichiometric beta-delithiated layered nickel oxide and graphite may be, respectively, about 4.9 g/cm3 and about 2.15 g/cm3. Dividing the weight of the solids by the respective true densities yields a volume occupied by the non-stoichiometric beta-delithiated layered nickel oxide of about 1.8 cm3 and a volume occupied by the graphite of about 0.42 cm3. The total solids volume is about 2.2 cm3. The battery designer may select the volume occupied by the cathode 12 to be about 3.06 cm3. Calculating the cathode porosity per the equation above [1−(2.2 cm3÷3.06 cm3)] yields a cathode porosity of about 0.28, or 28%.

The anode 14 can be formed of at least one electrochemically active anode material, a gelling agent, and minor amounts of additives, such as organic and/or inorganic gassing inhibitor. The electrochemically active anode material may include zinc; zinc oxide; zinc hydroxide; metal hydride, such as AB5(H), AB2(H), and A2B7(H); alloys thereof; and any combination thereof.

The content of electrochemically active anode material within the anode 14 may be referred to as the anode loading. The loading of the anode 14 may vary depending upon the electrochemically active anode material used within, and the size of, the battery. For example, a AA battery with a zinc electrochemically active anode material may have an anode loading of at least about 3.3 grams of zinc. The anode loading may be, for example, at least about 3.5 grams, about 3.7 grams, about 3.9 grams, about 4.1 grams, about 4.3 grams, or about 4.5 grams of zinc. The anode loading may be from about 4.0 grams to about 5.5 grams of zinc. The anode loading may be from about 4.2 grams to about 5.3 grams of zinc. For example, a AAA battery with a zinc electrochemically active anode material may have an anode loading of at least about 1.8 grams of zinc. For example, the anode loading may be from about 1.8 grams to about 2.5 grams of zinc. The anode loading may be, for example, from about 1.9 grams to about 2.4 grams of zinc. For example, a AAAA battery with a zinc electrochemically active anode material may have an anode loading of at least about 0.6 grams of zinc. For example, the anode loading may be from about 0.7 grams to about 1.3 grams of zinc. For example, a C battery with a zinc electrochemically active anode material may have an anode loading of at least about 9.3 grams of zinc. For example, the anode loading may be from about 10.0 grams to about 19.0 grams of zinc. For example, a D battery with a zinc electrochemically active anode material may have an anode loading of at least about 30.0 grams of zinc. For example, the anode loading may be from about 30.0 grams to about 45.0 grams of zinc. The anode loading may be, for example, from about 33.0 grams to about 39.5 grams of zinc.

Examples of a gelling agent that may be used within the anode 14 include a polyacrylic acid; a polyacrylic acid cross-linked with polyalkenyl ether of divinyl glycol; a grafted starch material; a salt of a polyacrylic acid; a carboxymethylcellulose; a salt of a carboxymethylcellulose (e.g., sodium carboxymethylcellulose); or combinations thereof. The anode 14 may include a gassing inhibitor that may include an inorganic material, such as bismuth, tin, or indium. Alternatively, the gassing inhibitor can include an organic compound, such as a phosphate ester, an ionic surfactant or a nonionic surfactant. The electrolyte may be dispersed throughout the cathode 12, the anode 14, and the separator 16. The electrolyte comprises an ionically conductive component in an aqueous solution. The ionically conductive component may be an alkali hydroxide. The hydroxide may be, for example, potassium hydroxide, cesium hydroxide, and any combination thereof. The concentration of the ionically conductive component may be selected depending on the battery design and its desired performance. An aqueous alkaline electrolyte may include a hydroxide, as the ionically conductive component, in a solution with water. The concentration of the alkali hydroxide within the electrolyte may be from about 0.20 to about 0.40, or from about 20% to about 40%, on a weight basis of the total electrolyte within the battery 10. For example, the hydroxide concentration of the electrolyte may be from about 0.25 to about 0.32, or from about 25% to about 32%, on a weight basis of the total electrolyte within the battery 10. The aqueous alkaline electrolyte may also include zinc oxide (ZnO). The ZnO may serve to suppress zinc corrosion within the anode. The concentration of ZnO included within the electrolyte may be less than about 5% by weight of the total electrolyte within the battery 10. The ZnO concentration, for example, may be from about 1% by weight to about 3% by weight of the total electrolyte within the battery 10.

The total weight of the aqueous alkaline electrolyte within a AA alkaline battery, for example, may be from about 3.0 grams to about 4.4 grams. The total weight of the alkaline electrolyte within a AA battery may be, for example, from about 3.3 grams to about 3.8 grams. The total weight of the alkaline electrolyte within a AA battery may be, for example, from about 3.4 grams to about 3.65 grams. The total weight of the aqueous alkaline electrolyte within a AAA alkaline battery, for example, may be from about 1.0 grams to about 2.0 grams. The total weight of the electrolyte within a AAA battery may be, for example, from about 1.2 grams to about 1.8 grams. The total weight of the electrolyte within a AAA battery may be, for example, from about 1.4 grams to about 1.8 grams. The total weight of the electrolyte within a AAAA battery may be from about 0.68 grams to about 1 gram, for example, from about 0.85 grams to about 0.95 grams. The total weight of the electrolyte within a C battery may be from about 11 grams to about 14 grams, for example, from about 12.6 grams to about 13.6 grams. The total weight of the electrolyte within a D battery may be from about 22 grams to about 30 grams, for example, from about 24 grams to about 29 grams.

The separator 16 comprises a material that is wettable or wetted by the electrolyte. A material is said to be wetted by a liquid when the contact angle between the liquid and the surface of the material is less than 90° or when the liquid tends to spread spontaneously across the surface of the material; both conditions normally coexist. The separator 16 may comprise a single layer, or multiple layers, of woven or nonwoven paper or fabric. The separator 16 may include a layer of, for example, cellophane combined with a layer of non-woven material. The separator 16 also can include an additional layer of non-woven material. The separator 16 may also be formed in situ within the battery 10. U.S. Pat. No. 6,514,637, for example, discloses such separator materials, and potentially suitable methods of their application. The separator material may be thin. The separator 16, for example, may have a dry material thickness of less than 250 micrometers (microns). The separator 16 may have a dry material thickness from about 50 microns to about 175 microns. The separator 16 may have a dry material thickness from about 70 microns to about 160 microns. The separator 16 may have a basis weight of about 40 g/m2 or 20 less. The separator 16 may have a basis weight from about 15 g/m2 to about 40 g/m2. The separator 16 may have a basis weight from about 20 g/m2 to about 30 g/m2. The separator 16 may have an air permeability value. The separator 16 may have an air permeability value as defined in International Organization for Standardization (ISO) Standard 2965. The air permeability value of the separator 16 may be from about 2000 cm3/cm2·min @ 1 kPa to about 5000 cm3/cm2·min @ 1 kPa. The air permeability value of the separator 16 may be from about 3000 cm3/cm2·min @ 1 kPa to about 4000 cm3/cm2·min @ 1 kPa. The air permeability value of the separator 16 may be from about 3500 cm3/cm2·min @ 1 kPa to about 3800 cm3/cm2·min @1 kPa.

The current collector 20 may be made into any suitable shape for the particular battery design by any known methods within the art. The current collector 20 may have, for example, a nail-like shape. The current collector 20 may have a columnar body and a head located at one end of the columnar body. The current collector 20 may be made of metal, e.g., zinc, copper, brass, silver, or any other suitable material. The current collector 20 may be optionally plated with tin, zinc, bismuth, indium, or another suitable material presenting a low electrical-contact resistance between the current collector 20 and, for example, the anode 14. The plating material may also exhibit an ability to suppress gas formation when the current collector 20 is contacted by the anode 14.

The seal 22 may be prepared by injection molding a polymer, such as polyamide, polypropylene, polyetherurethane, or the like; a polymer composite; and any combination thereof into a shape with predetermined dimensions. The seal 22 may be made from, for example, Nylon 6,6; Nylon 6,10; Nylon 6,12; Nylon 11; polypropylene; polyetherurethane; co-polymers; composites; and any combination thereof. Exemplary injection molding methods include both the cold runner method and the hot runner method. The seal 22 may contain other known functional materials such as a plasticizer, a crystalline nucleating agent, an antioxidant, a mold release agent, a lubricant, and an antistatic agent. The seal 22 may also be coated with a sealant. The seal 22 may be moisturized prior to use within the battery 10. The seal 22, for example, may have a moisture content of from about 1.0 weight percent to about 9.0 weight percent depending upon the seal material. The current collector 20 may be inserted into and through the seal 22.

The end cap 24 may be formed in any shape sufficient to close the battery. The end cap 24 may have, for example, a cylindrical or prismatic shape. The end cap 24 may be formed by pressing a material into the desired shape with suitable dimensions. The end cap 24 may be made from any suitable material that will conduct electrons during the discharge of the battery 10. The end cap 24 may be made from, for example, nickel-plated steel or tin-plated steel. The end cap 24 may be electrically connected to the current collector 20. The end cap 24 may, for example, make electrical connection to the current collector 20 by being welded to the current collector 20. The end cap 24 may also include one or more apertures, such as holes, for venting any gas pressure due to electrolyte leakage or venting of the battery due to buildup of excessive internal pressure. The current collector 20, the seal 22, and the end cap 24 may be collectively referred to as the end cap assembly.

EXAMPLES

Example 1. Preparation of Alpha-Delithiated Layered Nickel Oxide Via Treatment of Lithium Nickel Oxide with Ammonium Persulfate and Ammonium Hydroxide in a Mole Ratio of 1:2:3

To 0.5 liter deionized water in a 3 liter jacketed glass reactor, 232 g (1.0 mole) of solid ammonium persulfate (i.e., $(NH_4)_2S_2O_8$) was added forming a clear solution after stirring for about 3-5 minutes. To the persulfate solution, 200 ml of 50% (v/v) $NH_4OH$ solution (1.5 mole) was added. To the basic persulfate solution, 50 g (0.5 mole) of layered lithium nickel oxide ($LiNiO_2$) that had been ground and passed through a 20 mesh (U.S. Standard) sieve was added with stirring. The initial pH of the mixture was 9-12. The stirred mixture was heated at a rate of about 1° C./min to 60° C. After stirring the mixture at 60° C. for 24 hours, both heating and stirring were stopped and the solid product was allowed to settle for at least about 10 minutes. The clear blue-green supernatant solution was decanted while still warm. The pH of the supernatant solution was typically between 3 and 4. The solid alpha-delithiated nickel oxide product was washed with deionized water. After washing, the solid product was allowed to settle and the clear supernatant decanted. The washing process was repeated to remove soluble $Ni^{2+}$ complexes, soluble nickel and lithium sulfates, and residual sulfuric acid. The solid product was collected by vacuum filtration and dried at 60-80° C. in air for at about 12 hours. Yield of the dried alpha-delithiated nickel oxide product was 70-74%. The low-rate (e.g., 10 mA/g, ~C/40) button cell discharge capacity from a 635 type alkaline button cell ranged from 400 to 440 mAh/g.

Thus, Example 1 demonstrates forming in good yield an alpha-demetallated nickel oxide electrochemically active cathode material of the disclosure having good discharge capacity, according to methods of the disclosure.

Example 2. Preparation of α-Delithiated Layered Nickel Oxide Via Treatment of Lithium Nickel Oxide with Ammonium Persulfate and Potassium Hydroxide in a Mole Ratio of 1:2:4

To 0.5 liter deionized water in a 3 liter jacketed glass reactor, 232 g (1.0 mole) of solid ammonium persulfate (i.e., $(NH_4)_2S_2O_8$) was added forming a clear solution after stirring for about 3-5 minutes. To the persulfate solution, 172 ml of 46% (w/w) KOH solution (2.0 mole) was added. To the basic persulfate solution, 50 g (0.5 mole) of layered lithium nickel oxide ($LiNiO_2$) that had been ground and passed through a 20 mesh (U.S. Standard) sieve was added with stirring. The initial pH of the mixture was about 12-14. The stirred mixture was heated at a rate of about 1° C./min to 60° C. After stirring the mixture at 60° C. for 24 hours, both heating and stirring were stopped and the solid product allowed to settle for at least 10 minutes. The clear blue-green supernatant solution was decanted while still warm. The pH of the supernatant was typically between 2 and 4. The solid product was washed with deionized water. After washing, the solid product was allowed to settle and the clear supernatant decanted. The washing process was repeated to remove soluble Ni(II) complexes, nickel and lithium sulfates, and residual sulfuric acid. The solid product was collected by suction filtration and dried at 60-80° C. in air for at about 12 hours. Yield of dried product was about 74%. The low-rate (e.g., 10 mA/g, ~C/40) button cell discharge capacity from a 635 type alkaline button cell was about 430 mAh/g.

Thus, Example 2 demonstrates forming in good yield an alpha-demetallated nickel oxide electrochemically active cathode material of the disclosure having good discharge capacity, according to methods of the disclosure using increased amounts of hydroxide relative to Example 1.

Example 3. Method for Preparing α-Delithiated Layered Nickel Oxide Via Treatment of Lithium Nickel Oxide with Ammonium Persulfate and Ammonium Hydroxide in a Mole Ratio of 1:2:3

To a 3 liter jacketed glass reactor, 0.5 liter deionized water was added and heated to 60° C. To the hot deionized water, 200 ml of 50% (v/v) $NH_4OH$ (1.5 mole) solution was added with stirring followed by 232 g (1.0 mole) of solid ammonium persulfate $(NH_4)_2S_2O_8$) to form a clear 3M persulfate solution having an initial pH of 10-12. To the stirred basic persulfate solution, 50 g (0.5 mole) of layered lithium nickel oxide ($LiNiO_2$) powder that had been ground and passed through a 20 mesh sieve (U.S. Standard) was added. The mixture was heated with stirring at 60° C. for a total of about 24 hours. Both heating and stirring were stopped and the solid product allowed to settle for at least 10 minutes. A clear blue-green supernatant solution was decanted while still warm. The pH of the supernatant solution was typically about 4. The solid product was washed by stirring with deionized water. The solid product was allowed to settle and the clear supernatant solution decanted. The washing process was repeated to remove soluble nickel(II) complexes, residual sulfates, and residual sulfuric acid. The solid product was collected by suction filtration and dried at 60-80° C. in air for about 12 hours. Yield of dried product was about 70%. The low-rate (e.g., 10 mA/g, ~C/40) button cell discharge capacity from a 635 type alkaline button cell was about 420 mAh/g.

Thus, Example 3 demonstrates forming in good yield an alpha-demetallated nickel oxide electrochemically active cathode material of the disclosure having good discharge capacity, according to methods of the disclosure wherein the fluid composition was heated prior to addition of the alkali metal-containing nickel oxide, oxidant, and hydroxide.

Example 4. Method for Preparing α-Delithiated Layered Nickel Oxide Via Treatment with of Lithium Nickel Oxide with Ammonium Persulfate in Mole Ratio of 1:2 (No Hydroxide)

To 0.5 liter deionized water in a 1 liter jacketed glass reactor, 232 g (1.0 mole) ammonium persulfate $(NH_4)_2$ $S_2O_8$) was added forming a clear solution after stirring for about 3-5 minutes. To the persulfate solution, 50 g (0.5 mole) of layered lithium nickel oxide ($LiNiO_2$) that had been ground and passed through a 20 mesh (U.S. Standard) sieve was added with stirring. The initial pH of the mixture was 9-10. The stirred mixture was heated at a rate of about 1° C./min to 60° C. After stirring the mixture at 60° C. for 24 hours, both heating and stirring were stopped and the solid product was allowed to settle for at least 10 minutes. The clear blue-green supernatant solution was decanted while still warm. The pH of the supernatant was typically between 1 and 2. The solid product was washed with deionized water. After washing, the solid product was allowed to settle and the clear supernatant decanted. The washing process was repeated to remove soluble Ni(II) complexes, nickel and lithium sulfates, and residual sulfuric acid. The solid product was collected by suction filtration and dried at 60-80° C. in air for about 12 hours. Yield of dried product was 55-60%. The low-rate (e.g., 10 mA/g, ~C/40) button cell discharge capacity from a 635 type alkaline button cell was about 420 mAh/g.

Thus, Example 4 demonstrates forming in acceptable yield an alpha-demetallated nickel oxide electrochemically active cathode material of the disclosure having good discharge capacity, according to methods of the disclosure without the use of hydroxide.

Example 5. Method for Preparing α-Delithiated Layered Nickel Oxide Via Treatment of Lithium Nickel Oxide with Both Ammonium Persulfate and Sodium Persulfate in a Mole Ratio of 1:1:1 (No Hydroxide)

To 0.5 liter deionized water in a 1 liter jacketed glass reactor, 116 g (0.5 mole) ammonium persulfate $(NH_4)_2S_2O_8)$ and 121 g (0.5) sodium persulfate $(Na_2S_2O_8)$ were added forming a clear solution after stirring for about 3-5 minutes. To the mixed persulfate solution, 50 g (0.5 mole) of layered lithium nickel oxide $(LiNiO_2)$ that had been ground and passed through a 20 mesh (U.S. Standard) sieve was added with stirring. The initial pH of the mixture was about 9-10. The stirred mixture was heated at a rate of about 1° C./min to 60° C. After stirring the mixture at 60° C. for 24 hours, both heating and stirring were stopped and the solid product was allowed to settle for at least 10 minutes. The clear blue-green supernatant solution was decanted while still warm. The pH of the supernatant was typically about 4. The solid product was washed with deionized water. After washing, the solid product was allowed to settle and the clear supernatant decanted. The washing process was repeated to remove soluble Ni(II) complexes, nickel and lithium sulfates, and residual sulfuric acid. The solid product was collected by suction filtration and dried at 60-80° C. in air for about 12 hours. Yield of dried product was 60-65%. The low-rate (e.g., 10 mA/g, ~C/40) button cell discharge capacity from a 635 type alkaline button cell ranged from 430 to 440 mAh/g.

Thus, Example 5 demonstrates forming in acceptable yield an alpha-demetallated nickel oxide electrochemically active cathode material of the disclosure having good discharge capacity, according to methods of the disclosure using a combination of oxidants.

Example 6. Method for Preparing α-Delithiated Layered Nickel Oxide Via Treatment of Lithium Nickel Oxide with Both Sodium Persulfate and Potassium Persulfate in a Mole Ratio of 1:1:1 (No Hydroxide)

To a 1 liter jacketed glass reactor, 0.5 liter deionized water, 121 g (0.5 mole) sodium persulfate $(Na_2S_2O_8)$ and 116 g (0.5) potassium persulfate $(K_2S_2O_8)$ were added with stirring. After stirring for about 3-5 minutes, 50 g (0.5 mole) of layered lithium nickel oxide that had been ground and passed through a 20 mesh (U.S. Standard) sieve was added to the clear stirred solution. The initial pH of the mixture was about 12. The stirred mixture was heated at a rate of about 1° C./min to 60° C. After stirring the mixture at 60° C. for 24 hours, both heating and stirring were stopped and the solid product allowed to settle for at least 10 minutes. The clear blue-green supernatant solution was decanted while warm. The pH of the supernatant was typically about 4. The solid product was washed with deionized water. After washing, the solid product was allowed to settle and the clear supernatant decanted. The washing process was repeated several times to remove soluble Ni(II) complexes, nickel and lithium sulfate, and sulfuric acid. The solid product was collected by suction filtration and dried at 60-80° C. in air for about 12 hours. Yield of dried product was 70-75%. The low-rate (e.g., 10 mA/g, ~C/40) button cell discharge capacity from a 635 type alkaline button cell was about 430-435 mAh/g.

Thus, Example 6 demonstrates forming in good yield an alpha-demetallated nickel oxide electrochemically active cathode material of the disclosure having good discharge capacity, according to methods of the disclosure using a combination of oxidants.

Example 7. Method for Preparing α-Delithiated Layered Nickel Oxide Via Treatment of Layered Lithium Nickel Oxide with Sodium Persulfate in a Mole Ratio of 1:1.9 (No Hydroxide)

To a 1 liter jacketed glass reactor, 0.5 liter of deionized water was added and heated to 80° C. To the pre-heated water, 230 g (0.95 mole) of dry sodium persulfate $(Na_2S_2O_8)$ was added with stirring, forming a clear solution after about 5 minutes. A 50 g (0.5 mole) portion of layered lithium nickel oxide $(LiNiO_2)$ was added to the hot, stirred persulfate solution. The mixture was stirred for 2 hours at 80° C. and then both heating and stirring were discontinued and the solid product allowed to settle. The clear supernatant solution was decanted while still hot. The solid product was washed with deionized water with stirring. After washing, the solid product was allowed to settle and the supernatant decanted. This washing process was repeated twice. The solid product was collected by vacuum filtration and dried at 60-70° C. in air for at about 12 hours. The yield of dried product was about 72%. The low-rate (e.g., 10 mA/g cathode active, ~C/40) button cell discharge capacity from a 635 type alkaline button cell was about 430 mAh/g.

Thus, Example 7 demonstrates forming in good yield an alpha-demetallated nickel oxide electrochemically active cathode material of the disclosure having good discharge capacity, according to methods of the disclosure using less oxidant than the previous Examples.

Example 8. Method for Preparing α-Delithiated Layered Nickel Oxide Via Treatment of Lithium Nickel Oxide with Sodium Persulfate Only at a Mole Ratio of 1:1.5 (without Hydroxide) at 85° C. for 1 Hour To a 1 liter jacketed glass reactor, 0.5 liter deionized water was added and heated to 85° C. To the pre-heated water, 182 g (0.75 mole) of dry sodium persulfate $(Na_2S_2O_8)$ was added with stirring to form a clear solution after about 5 minutes. A 50 g (0.5 mole) portion of layered lithium nickel oxide was added to the hot, stirred persulfate solution. The mixture was stirred for 1 hour at 85° C. and then both heating and stirring were stopped and the solid product allowed to settle. The clear supernatant solution was decanted while still hot. The solid product was washed with deionized water with stirring. After washing, the solid product was allowed to settle and the supernatant decanted. The washing process was repeated twice. The solid product was collected by vacuum filtration and dried at 60-70° C. in air for at about 12 hours. The yield of dried product was about 71%. The low-rate (e.g., 10 mA/g cathode active, ~C/40) button cell discharge capacity from a 635 type alkaline button cell was about 430 mAh/g.

Thus, Example 8 demonstrates forming in good yield an alpha-demetallated nickel oxide electrochemically active cathode material of the disclosure having good discharge capacity, according to methods of the disclosure using decreased amounts of oxidant and increased temperatures, relative to the methods of the previous Examples.

Example 9: Effect of Counter Cation

The effect of the choice of counter cation for the oxidant and hydroxide on capacity and yield are shown below in Table 1, for the listed ratio of reactants for a system wherein the alkali metal-containing nickel oxide is lithium nickel oxide (LNO), the oxidant is the identified peroxydisulfate salt (PS), and the hydroxide is the identified hydroxide salt (OH), as well as the phases present in the product, including the desired product alpha-delithiated nickel oxide (α-DLNO), the starting material (LNO), and side products such as gamma-nickel oxyhydroxide (γ-NiOOH).

significant amounts of a γ-NiOOH-related phase mixed with unreacted layered lithium nickel oxide as well as the desired α-delithiated layered nickel oxide product. Without intending to be bound by theory, it is believed that the γ-NiOOH-related phase forms from the insertion of sodium or potassium ions accompanied by solvating water molecules into the nickel oxide layers, inducing changes in the stacking sequence of the nickel oxide layers. Further, in those cases where mixed cations were used, selection of ammonium persulfate in combination with either sodium or potassium hydroxide provided greater discharge capacities than when either sodium or potassium persulfate was used in combination with ammonium hydroxide. Substitution of either sodium persulfate or potassium persulfate for ammonium persulfate in combination with ammonium hydroxide provided higher product yields of alpha-delithiated layered nickel oxide. However, use of ammonium persulfate, while desirable due to the high solubility in water relative to the alkali metal persulfate salts (85 g/100 cm$^3$ at 25° C., vs. 73 and 6 g/100 cm$^3$ for the Na$^+$ and K$^+$ salts, respectively), in combination with ammonium hydroxide may be unsuitable for commercial processes due to the evolution of ammonia gas.

TABLE 1

Effect of choice of persulfate and hydroxide cations on discharge capacity and yield

| PS CATION | OH CATION | RATIO OF REACTANTS LNO:PS:OH | REACTION CONDITIONS | PH START | PH END | DISCHARGE CAPACITY (MAH/G) | PRODUCT YIELD (%) | PHASES PRESENT (FROM XRD PATTERN) |
|---|---|---|---|---|---|---|---|---|
| NH$_4$$^+$ | NH$_4$$^+$ | 1:2:2 | 60° C./24 H | 12 | 4 | 420 | 70 | A-DLNO |
| NH$_4$$^+$ | NA$^+$ | 1:2:2 | 60° C./24 H | 14 | 6 | 430 | 74 | A-DLNO |
| NH$_4$$^+$ | K$^+$ | 1:2:2 | 60° C./24 H | 14 | 6 | 460 | 65 | A-DLNO |
| NH$_4$$^+$ | LI$^+$ | 1:2:2 | 60° C./24 H | 12 | 6 | 400 | 78 | A-DLNO + LNO |
| NH$_4$$^+$ | NONE | 1:2:0 | 60° C./24 H | 9 | 2 | 420 | 57 | A-DLNO |
| NA$^+$ | NA$^+$ | 1:2:2 | 60° C./24 H | 14 | 9 | 225 | 92 | γ-NIOOH + A-DLNO |
| NA$^+$ | K$^+$ | 1:2:2 | 60° C./24 H | 14 | 9 | 147 | 92 | A-DLNO + LNO |
| NA$^+$ | NH$_4$$^+$ | 1:2:2 | 60° C./24 H | 12 | 5 | 402 | 75 | A-DLNO |
| NA$^+$ | NONE | 1:2:0 | 60° C./24 H | — | — | 424 | 79 | A-DLNO |
| K$^+$ | K$^+$ | 1:2:2 | 60° C./24 H | 14 | 9 | 152 | 89 | γ-NIOOH + A-DLNO |
| K$^+$ | NA$^+$ | 1:2:2 | 60° C./24 H | 14 | 9 | 133 | 90 | A-DLNO + LNO |
| K$^+$ | NH$_4$$^+$ | 1:2:3 | 60° C./24 H | 12 | 5 | 420 | 75 | A-DLNO |
| K$^+$ | NONE | 1:2:0 | 60° C./24 H | — | — | 424 | 66 | A-DLNO |

As shown in Table 1, in the case where ammonium persulfate was used in combination with various alkali metal hydroxides, the observed product yield were about 4-5% greater when the hydroxide cation was sodium and about 4-5% less when the hydroxide cation was potassium, compared with when the hydroxide cation was ammonium. Product yields ranged from about 65 wt % to about 80 wt % depending on the particular combination of cations. For example, in the cases where the persulfate cation was ammonium and the hydroxide cations were alkali metal ions, the yields of delithiated products generally increased in the order: K$^+$<NH$_4$+<Na$^+$(<Li$^+$). In the case where the hydroxide cation was lithium, the x-ray powder diffraction powder pattern of the delithiated product revealed the presence of unconverted lithium nickel oxide in addition to the α-delithiated layered nickel oxide. When both cations were either sodium or potassium, product yields as high as about 90 wt % were obtained. However, the x-ray powder diffraction patterns of these products revealed the presence of The data in Table 1 further show that at least some oxidation of the starting lithium nickel oxide (LNO) occurs under all conditions. The starting material, crystalline layered lithium nickel oxide demonstrated a discharge capacity of less than 10 mAh/g, when tested in an alkaline cell under the same conditions as α-demetallated nickel oxide electrochemically active cathode materials.

Example 10: Effect of Reaction Time and Temperature

The effect of reaction time and temperature on resulting discharge capacity and yield for a fluid composition including a 1:2:2 molar ratio of alkali metal-containing nickel oxide, oxidant, and hydroxide salt is shown below in Table 2.

TABLE 2

| | | | Effect of treatment temperature and time on discharge capacity and yield | | |
| --- | --- | --- | --- | --- | --- |
| TEMP. (° C.) | TIME (HRS) | PH START | PH END | CAPACITY (MAH/G) | YIELD (%) |
| 25 | 24 | 12 | 9 | 235 | 95 |
| 25 | 72 | 12 | 9 | 270 | 93 |
| 40 | 24 | 12 | 8 | 350 | 85 |
| 50 | 24 | 12 | 8 | 368 | 85 |
| 60 | 12 | 12 | 5 | 398 | 82 |
| 60 | 24 | 12 | 4 | 420 | 70 |
| 70 | 6 | 12 | 6 | 390 | 82 |
| 70 | 12 | 12 | 4 | 433 | 63 |
| 70 | 24 | 12 | 4 | 462 | 34 |
| 80 | 4 | 12 | 4 | 447 | 64 |
| 80 | 5 | 12 | 3 | 430 | 40 |
| 80 | 12 | 12 | 1 | — | 0 |

Without intending to be bound by theory, it is believed that discharge capacities of the formed α-demetallated nickel oxide electrochemically active cathode material typically increase with increased reaction time at constant temperature up to about 80° C. due to increased conversion of the alkali metal-containing nickel oxide starting material to the alpha-demetallated nickel oxide product over time, but that product yield also decreased as reaction time was increased due to the competing acid-promoted disproportionation reaction, which converts the starting material to soluble Ni(II) species. At temperatures of about 80° C. or above, both discharge capacity and product yield typically decreased with increasing treatment time. Without intending to be bound by theory, it is believed that as the temperature increases above about 80° C., after about 6 hours, there is significant decomposition of the oxidant, resulting in low yields of electrochemical active materials (e.g., less than 40%), and in some cases (e.g., after about 12 hours or more), can result in complete decomposition of the nickel materials resulting in no yield of electrochemically active cathode material. Further, it was shown that for a given treatment time of, e.g., 24 hours, as the temperature of the reaction was increased, the product yields generally decreased but the corresponding discharge capacity (low rate) generally increased. Without intending to be bound by theory it is believed that at low temperatures (e.g., up to less than about 50° C.), the solubility of the oxidant is low, resulting in slow conversion from the alkali metal-containing nickel oxide to the higher capacity alpha-demetallated nickel oxide, but the yield is high because little to no disproportionation reaction takes place. It is further believed, without intending to be bound by theory, at temperatures of above about 50° C., the solubility of the oxidant increases with increasing temperature, thereby increasing the rate of the conversion of the alkali metal-containing nickel oxide to the alpha-demetallated nickel oxide, increasing the capacity of the resulting electrochemically active cathode material, but the conversion to the alpha-demetallated nickel oxide can compete with the acid promoted disproportionation reaction, which can result in dissolved Ni(II) materials and decreased yields.

Example 11: Effect of the Ratio of Reactants

Changes in the molar ratio of reactants tended to influence the discharge capacity more than product yield when the cation is the same for both the persulfate and hydroxide salts as shown in Table 3.

TABLE 3

| | | | | | | |
| --- | --- | --- | --- | --- | --- | --- |
| | | Effect of mole ratio of lithium nickel oxide to ammonium persulfate to ammonium hydroxide on yield and low rate button cell discharge capacity | | | | |
| Ratio of Reactants LNO:PS:OH | Temp. (° C.) | Time (hrs) | pH Start | pH End | Capacity (mAh/g) | Yield (%) |
| 1:1:1 | 60 | 24 | 10 | 7 | 350 | 82 |
| 1:1:2 | 60 | 24 | 12 | 7 | 350 | 82 |
| 1:1.5:1 | 60 | 24 | 10 | 6 | 400 | 82 |
| 1:1.5:2 | 60 | 24 | 12 | 6 | 400 | 80 |
| 1:2:1 | 60 | 24 | 10 | 3 | 430 | 52 |
| 1:2:1.5 | 60 | 24 | 11 | 4 | 360 | 70 |
| 1:2:2 | 60 | 24 | 12 | 4 | 420 | 70 |
| 1:2:2 | 70 | 24 | 12 | 4 | 462 | 34 |
| 1:2:2 | 70 | 12 | 12 | 4 | 433 | 63 |
| 1:2:2 | 80 | 4 | 12 | 4 | 447 | 64 |
| 1:2:3 | 60 | 24 | 12 | 5 | 420 | 70 |
| 1:2:4 | 60 | 24 | 12 | 6 | 380 | 79 |

For example, for a constant reaction temperature of 60° C. and total reaction time of 24 hours, when the cation is ammonium ion for both persulfate and hydroxide salts, doubling the amount of hydroxide at a fixed mole ratio of lithium nickel oxide to persulfate of either 1:1 or 1:1.5 has little impact on either the discharge capacity or product yield. However, increasing the amount of persulfate by 50% at a fixed mole ratio of lithium nickel oxide to hydroxide of 1:2 results in an increase in capacity of about 15%. Further, doubling the amount of persulfate at a fixed mole ratio of oxide to hydroxide of 1:2 produced an increase in capacity of about 20%. Increasing the mole ratio of hydroxide to persulfate from 1:1 to 1:2 at a fixed mole ratio of oxide to persulfate of 1:2 produced a slight decrease (e.g., −10%) in low-rate discharge capacity, but a slight increase (e.g., +13%) in the yield of delithiated product. Increasing the ratio of hydroxide to persulfate also resulted in a higher pH for the supernatant at the end of treatment. The appearance of a high final pH is consistent with higher product yield. Decreasing the ratio of hydroxide to persulfate to 1:2 from 2:2, while maintaining the oxide to persulfate ratio at 1:2 increased capacity to 430 mAh/g, but decreased yield to 52% for a supernatant pH of 4. In other cases, where the final pH of the reaction solution was in the range of 6 to 7, the corresponding product yields were 79-82 wt %. However, the corresponding capacities of the delithiated products were typically less than about 400 mAh/g. At relatively low pH (e.g., <3), it is possible for delithiation of lithium nickel oxide to occur via an acid-promoted disproportionation reaction as well as by oxidative delithiation. However, since the yield of delithiated product via the disproportionation reaction is less than about 50%, the yield of delithiated product isolated from a solution having a low pH is typically less than that from a higher pH solution. In addition, the supernatant solution is also darker green in color indicating a higher concentration of dissolved $Ni^{2+}$. However, product yields are greater for shorter total reaction times, for example, 12 hours versus 24 hours.

By selecting preferred combinations of hydroxide salt cation, mole ratio of lithium nickel oxide to ammonium persulfate to hydroxide, treatment temperature, and treatment time, it is possible to increase discharge capacity up to 462 mAh/g (e.g., for $NH_4+$, 24 hr at 70° C.) and product yields up to 79 wt % (e.g., for $Na^+$). X-ray powder diffraction analysis was used to confirm that the products were single phase α-delithiated layered nickel oxide with little or no unreacted precursor or other impurity phases present. As shown in Table 4, below, delithiated products can be obtained having a discharge capacity from a 635 type alkaline button cell greater than about 400 mAh/g at temperatures ranging from 60-80° C. and that as the reaction temperature is increased, shorter reaction times and a larger excess of sodium hydroxide is needed to maintain an acceptable yield of the delithiated product.

TABLE 4

Effect of mole ratio of lithium nickel oxide to ammonium persulfate to sodium hydroxide and treatment conditions on delithiated layered nickel oxide yield and capacity

| Ratio of Reactants LNO:PS:OH | Temp. (° C.) | Time (hrs) | pH start | pH end | Capacity (mAh/g) | Yield (%) |
|---|---|---|---|---|---|---|
| 1:2:2 | 60 | 24 | 14 | 5 | 425 | 74 |
| 1:2:2 | 70 | 14 | 14 | 5 | 425 | 43 |
| 1:2:4 | 70 | 14 | 14 | 6 | 435 | 66 |
| 1:2:4 | 80 | 5 | 14 | 6 | 426 | 65 |
| 1:2:6 | 70 | 24 | 14 | 9 | 400 | 66 |
| 1:2:6 | 80 | 5 | 14 | 9 | 408 | 73 |

As shown in Table 5, a product yield ≥80 wt % and a discharge capacity ≥400 mAh/g can be obtained for a lithium nickel oxide to ammonium persulfate to potassium hydroxide mole ratio of 1:2:6, a treatment temperature of 70° C., and a reaction time of 14 hours. Further, a discharge capacity of 460 mAh/g and a product yield of about 65 wt % was obtained for an oxide to persulfate to hydroxide mole ratio of 1:2:2, a treatment temperature of 60° C., and a treatment time of 24 hours. Because it is highly desirable to minimize manufacturing cost, it is necessary to develop a robust manufacturing process for preparing delithiated products having acceptably high discharge capacities in the highest yield in the shortest possible time. From Tables 3, 4, and 5, delithiated products having capacities ≥400 mAh/g have been obtained in yields ≥70 wt % using excess persulfate in combination with an excess of ammonium, sodium or potassium hydroxide. Further, the higher reaction temperatures required shorter reaction times.

TABLE 5

Effect of mole ratio of lithium nickel oxide to ammonium persulfate to potassium hydroxide and treatment conditions on alpha-delithiated layered nickel oxide yield and capacity

| Ratio of Reactants LNO:PS:OH | Temp. (° C.) | Time (hrs) | pH start | pH end | Capacity (mAh/g) | Yield (%) |
|---|---|---|---|---|---|---|
| 1:2:2 | 60 | 24 | 14 | 5 | 460 | 65 |
| 1:2:2 | 70 | 14 | 14 | 5 | 440 | 34 |
| 1:2:4 | 70 | 14 | 14 | 6 | 444 | 55 |
| 1:2:4 | 80 | 5 | 14 | 6 | 440 | 53 |
| 1:2:6 | 70 | 14 | 14 | 9 | 400 | 83 |
| 1:2:6 | 80 | 5 | 14 | 9 | 370 | 79 |

In embodiments wherein a mixture of oxidants are used having different cations, for example, ammonium persulfate in combination with either sodium and/or potassium persulfate, or a combination of sodium and potassium persulfate are used, the demetallation can take place without hydroxide. As shown in Table 6, binary mixtures of persulfate salts can provide delithiated products having discharge capacities comparable to or greater than those obtained using a single persulfate salt in combination with a hydroxide. For example, from Table 6, the combination of sodium persulfate and potassium persulfate in a 1:1 mole ratio (without added hydroxide) in a 1:1:1 mole ratio with lithium nickel oxide provided a delithiated product having a capacity of 434 mAh/g in 76% yield. For comparison, from Table 1, a combination of potassium persulfate and ammonium hydroxide provided a delithiated product having a 420 mAh/g capacity in 75% yield. Also, from Table 1, a combination of sodium persulfate and ammonium hydroxide provided a product having a 402 mAh/g capacity in 75% yield.

TABLE 6

Effect of binary mixtures of persulfate salts with no added base on delithiated layered nickel oxide yield and discharge capacity

| PS1 Cation | PS2 Cation | Ratio LNO:PS1:PS2 | Temp. (° C.) | Time (hrs) | Capacity (mAh/g) | Yield (%) |
|---|---|---|---|---|---|---|
| $NH_4^+$ | $Na^+$ | 1:1:1 | 60 | 24 | 440 | 61 |
| $NH_4^+$ | $K^+$ | 1:1:1 | 60 | 24 | 430 | 58 |
| $Na^+$ | $K^+$ | 1:1:1 | 60 | 24 | 430 | 76 |
| $NH_4^+$ | none | 1:2:0 | 60 | 24 | 420 | 57 |
| $Na^+$ | none | 1:2:0 | 60 | 24 | 424 | 79 |
| $K^+$ | none | 1:2:0 | 60 | 24 | 424 | 66 |

Further, as shown in Table 6, acceptable discharge capacity and yield can be achieved when the persulfate salt was used in a 2:1 mole ratio with lithium nickel oxide without hydroxide to provide the delithiated product.

The effect of increasing the reaction temperature while keeping the total reaction time and the layered lithium nickel oxide to oxidant ratio constant is demonstrated in Table 7, below.

TABLE 7

Effect of mole ratio of lithium nickel oxide
to sodium persulfate without hydroxide and treatment
conditions on delithiated nickel oxide yield and capacity

| Ratio of Reactants LNO:PS | Temp. (° C.) | Time (hrs) | Capacity (mAh/g) | Yield (%) |
|---|---|---|---|---|
| 1:2 | 60 | 24 | 420 | 79 |
| 1:2 | 63 | 24 | 416 | 70 |
| 1:1.5 | 63 | 24 | 420 | 70 |
| 1:2 | 65 | 24 | 437 | 60 |
| 1:2 | 65 | 14 | 438 | 73 |
| 1:2 | 70 | 14 | 449 | 50 |
| 1:1.9 | 70 | 6 | 420 | 76 |
| 1:1.8 | 70 | 6 | 405 | 76 |
| 1:1.5 | 70 | 14 | 449 | 62 |
| 1:1.9 | 71 | 7.75 | 430 | 68 |
| 1:2 | 75 | 5 | 443 | 70 |
| 1:2 | 76 | 3 | 434 | 73 |
| 1:2 | 78 | 2 | 424 | 70 |
| 1:2 | 80 | 4 | 448 | 47 |
| 1:2 | 80 | 2 | 449 | 65 |
| 1:1.9 | 80 | 2.5 | 438 | 68 |
| 1:1.9 | 80 | 2 | 430 | 72 |
| 1:1.8 | 80 | 2 | 428 | 72 |
| 1:1.5 | 85 | 1 | 430 | 71 |
| 1:0.75 | 85 | 5 | 425 | 69 |

As shown in Table 7, both acceptable capacities and yields can be obtained at short total reaction times, for example, 1-5 hours, at reaction temperatures of 75-85° C. At higher temperatures (e.g., 80° C.) and very short reaction times (e.g., 2 hours) both high capacities (greater than about 420 mAh/g) and relatively high yields (greater than about 70%) were obtained. Additionally, the treatment time could be decreased to 1 hour and a greater than 70% yield achieved when the temperature was increased to 85° C. and the ratio of oxidant to lithium nickel oxide adjusted to 1.5:1. Surprisingly, the ratio of oxidant to lithium nickel oxide could be decreased to 0.75:1 when treatment time at 85° C. was increased to 5 hours. Such results were unexpected in view of the expectation in the art that typically long reaction times (24 hour or more) are needed to substantially oxidize an alkali metal-containing metal oxide to an alpha-demetallated nickel oxide by oxidative demetallation and the expectation that at high temperatures a peroxydisulfate salt or a monopersulfate salt would thermally decompose. Such a result was further unexpected in the case of an alkali-metal containing nickel oxide in view of the expectation in the art that the thermal decomposition of the oxidant would catalyze the disproportionation reaction to form soluble Ni(II), which soluble Ni(II) is known to catalyze the thermal decomposition of peroxydisulfate and monopersulfate salts. Increasing reaction times at the higher temperatures produced a slight increase in capacity, but resulted in a decrease in product yield. Without intending to be bound by theory, it is believed that at relatively high temperatures (about 80° C. or more) the rate of persulfate ion self-decomposition increases such that the sulfuric acid generated by this decomposition promotes the disproportionation of any remaining Ni(III) in the nearly completely delithiated layered nickel oxide. The Ni(II) that is formed as a result of this disproportionation reaction dissolves in the acidic solution while the insoluble Ni(IV) formed increases the capacity of the remaining delithiated product. Comparing the last two entries of Table 7, it can be seen that by decreasing the amount of persulfate, a delithiated lithium nickel oxide having nominally the same discharge capacity and the same reaction yield can be prepared by increasing the reaction time at 85° C., which has the potential to result in substantial manufacturing cost savings.

A comparison of the low-rate discharge performance of button cells containing delithiated layered nickel oxide prepared by methods of the disclosure at 80° C. for 2-2.5 hours with a delithiated layered nickel oxide prepared by the known method of treatment of layered lithium nickel oxide with 6M sulfuric acid at 2° C. for 48 hours demonstrated that discharge capacities to a 0.8V cutoff voltage are nearly identical and can be greater than that of delithiated nickel oxide prepared with conventional methods (about 430 mAh/g for the delithiated nickel oxide of the disclosure compared to 420 mAh/g for the material prepared by sulfuric acid treatment). Thus, the methods of the disclosure advantageously can provide an electrochemically active cathode material that performs as well as, or better than, conventionally prepared materials, in substantially shorter times.

Example 12. Insertion of an Alkali Metal into an α-Delithiated Layered Nickel Oxide A 500 g portion of the α-delithiated nickel oxide prepared by the method of Example 8 was thoroughly mixed with 167 g of 8.7N KOH solution in a sealed polyethylene bottle at room temperature for 24 hours to form a beta-delithiated layered nickel. The resulting semi-solid mixture was washed three times with aliquots of deionized water and dried at 70° C. in air for at about 12 hours. The low-rate discharge capacity of button cells containing the beta-delithiated layered nickel oxide typically was in the range of 340-360 mAh/g.

Thus, Example 12 demonstrates forming in good yield a beta-delithiated nickel oxide electrochemically active cathode material and having good discharge capacity for a beta-delithiated nickel oxide material, according to methods of the disclosure.

Example 13. Preparation of Prototype AA Cells Containing the Potassium-Containing Beta-Delithiated Layered Nickel Oxide of Example 9

Prototype AA cells were built using a cathode mixture containing the material of Example 12, admixed with an electrically conductive carbon additive (e.g., Timrex MX15, Imerys Graphite & Carbon), and 12N KOH solution in a weight ratio of 91.3:6.3:2.4. The cathode mixture was granulated and then pressed into circular rings having a nominal ID of 9.8 mm and weighing about 2.25 g each. An anode mixture containing centrifugally spun zinc particles and zinc fines in a weight ratio of 71:25 combined with conventional gelling agents, such as sodium carboxymethyl cellulose or the sodium salt of an acrylic acid co-polymer, and 8.7N KOH electrolyte solution to form a dispensable slurry. The coulombic balance of the cells was intentionally designed to be cathode limited (i.e., anode in excess). Therefore, each prototype cell contained about 9 g of the cathode mixture and about 8 g of the anode mixture (i.e., slurry). The prototype AA cells included standard laminated production separator papers positioned between the anode and cathode. A standard anode current collector was inserted into the anode slurry. The prototype AA cells also included a standard production seal assembly and were mechanically crimped.

The finished prototype AA cells were tested fresh (i.e., within 24 h after fabrication). Cells were discharged continuously at a low-drain rate of 30 mA (i.e., constant current) which corresponds to a nominal C/40 discharge rate. Cells were discharged until a 0.8 V cutoff voltage was reached. Cells also were discharged intermittently at an intermediate drain rate of 250 mW. The intermittent test consisted of discharging the cell for 1 hour at 250 mW followed by 7 hours of rest. This duty cycle was repeated until a 0.8 V cutoff voltage was reached under load. In some cases, cells were stored for 2 weeks at 40° C. to evaluate capacity retention. The results of discharge tests for prototype AA cells containing the beta-delithiated layered nickel oxide prepared from alpha-delithiated layered nickel oxide that had been delithiated either by a combination of ammonium persulfate and ammonium hydroxide or by sodium persulfate without hydroxide as described in Example 3 are summarized in Table 8, below.

For comparison, prototype AA cells of similar design containing beta-delithiated layered nickel oxide prepared from alpha-delithiated layered nickel oxide that had been delithiated by treating the layered lithium nickel oxide with 6N sulfuric acid at 2° C. for 48 hours were built and tested in the same manner. After storage at 40° C. for 2 weeks, cells beta-delithiated layered nickel oxide prepared from alpha-delithiated nickel oxide delithiated using ammonium persulfate and ammonium hydroxide retained 92% of their fresh capacity versus cells containing beta-delithiated layered nickel oxide prepared from alpha-delithiated layered nickel oxide delithiated using 6M sulfuric acid retained 95% of their fresh capacity. However, in the case of cells containing beta-delithiated layered nickel oxide prepared from alpha-delithiated nickel oxide delithiated using sodium persulfate without hydroxide retained only 85% of their fresh capacity. In the case of the intermittent 250 mW discharge test, the fresh capacity of cells containing beta-delithiated layered nickel oxide prepared from alpha-delithiated nickel oxide delithiated using sodium persulfate without hydroxide was somewhat greater than that for cells containing beta-delithiated layered nickel oxide prepared from alpha-delithiated nickel oxide delithiated using either 6M sulfuric acid or ammonium persulfate plus ammonium hydroxide. However, the cells containing beta-delithiated layered nickel oxide prepared from alpha-delithiated layered nickel oxide delithiated using ammonium persulfate plus ammonium hydroxide retained 98% of their fresh capacity after 2 weeks storage at 40° C.

TABLE 8

Prototype AA cell discharge test performance

| Delithiation treatment | Fresh | | Stored 2 wks, 40° C. | |
|---|---|---|---|---|
| | 30 mA cont. | 250 mW intermit. | 30 mA cont. | 250 mW intermit. |
| $(NH_4)_2S_2O_8$ + $NH_4OH$ 60° C., 24 h | 3.25 Ah | 2.75 Ah | 3.0 Ah | 2.7 Ah |
| $Na_2S_2O_8$ only 85° C., 1 h | 3.31 Ah | 2.82 Ah | 2.82 Ah | — |
| 6N $H_2SO_4$ 2° C., 48 h | 3.3 Ah | 2.8 Ah | 3.15 Ah | — |

Thus, Example 13 demonstrated that it is possible to achieve comparable discharge capacities for alkaline button test cells and prototype AA alkaline cells for beta-delithiated layered nickel oxide prepared from alpha-delithiated layered nickel oxide that had been delithiated using either sulfuric acid or a persulfate salt. However, the yield of alpha-delithiated layered nickel oxide prepared using a persulfate salt as the chemical oxidant can be substantially greater than that typically observed for the acid-promoted disproportionation process. In fact, the improvement in yield can be on the order of 70%. Further, in the case of treatment with sodium persulfate without hydroxide, the total reaction time can be drastically reduced from 48 hours in the case of 6M sulfuric acid at 2° C. or 24 hours in the case of ammonium persulfate solution with ammonium hydroxide at 60° C. to 2 hours or less for treatment at 80-85° C. with sodium persulfate solution without hydroxide. In addition, it is possible to achieve alpha-delithiated product yields as high as 80% using persulfate salts. Thus, both higher product yields and higher manufacturing throughput can be achieved using persulfate salts as the chemical oxidant to delithiate layered lithium nickel oxide. This can enable a substantial reduction in the manufacturing cost of cathode active material in alkaline batteries.

The foregoing description is given for clearness of understanding only, and no unnecessary limitations should be understood therefrom, as modifications within the scope of the disclosure may be apparent to those having ordinary skill in the art.

All patents, publications, and references cited herein are hereby fully incorporated by reference. In the case of conflict between the present disclosure and incorporated patents, publications, and references, the present disclosure should control.

What is claimed:

1. A method of preparing an electrochemically active cathode material, comprising:

reacting an alkali metal-containing nickel oxide having a formula $A_{1-a}Ni_{1+a-z}M_zO_2$, wherein A comprises an alkali metal, $0<a\leq0.2$, M comprises a transition metal or main group metal, and $0\leq z\leq0.2$, with a chemical oxidant comprising a peroxydisulfate salt, a monopersulfate salt, or a combination thereof, in a fluid composition at a temperature of 50° C. or greater for at least a period of time sufficient to form an alkali metal-deficient nickel oxide electrochemically active cathode material having a general formula $A_xH_yNi_{1+a}O_2 \cdot nH_2O$, wherein:

A comprises an alkali metal;

$$0.08 \leq x < 0.2;$$

$$0 \leq y < 0.3;$$

$$0.02 < a \leq 0.2;$$

$$0 \leq z \leq 0.2; \text{ and}$$

$$0 < n < 2.$$

2. The method of claim 1, wherein the temperature is in a range of about 55° C. to about 85° C.

3. The method of claim 1, wherein the oxidant comprises a peroxydisulfate salt.

4. The method of claim 1, wherein A comprises Li.

5. The method of claim 1, wherein the time sufficient to form the alkali metal-deficient nickel oxide electrochemically active cathode material is about 1 hour to about 24 hours.

6. The method of claim 1, wherein the time sufficient to form the alkali metal-deficient nickel oxide electrochemically active cathode material is about 1 hour to about 6 hours.

7. The method of claim 1, wherein the method does not include addition of mineral acid to the mixture.

8. The method of claim 1, wherein the fluid composition further comprises an alkali metal hydroxide, an ammonium hydroxide, or a combination thereof.

9. The method of claim 8, wherein the alkali metal-containing nickel oxide, the oxidant, and the hydroxide salt are provided in a molar ratio of about 1:0.75:1 to about 1:2:6.

10. The method of claim 8, wherein a counter cation of the oxidant and a counter cation of the hydroxide salt are each ammonium.

11. The method of claim 8, wherein one of an oxidant counter cation or hydroxide counter cation comprises ammonium and the other comprises potassium.

12. The method of claim 8, wherein a counter cation of the oxidant comprises ammonium and a counter cation of the hydroxide salt comprises sodium.

13. The method of claim 1, wherein the fluid composition has a pH in a range of about 8 to about 12.

14. The method of claim 1, wherein the fluid composition is substantially free of a hydroxide salt.

15. The method of claim 1, wherein the alkali metal-containing nickel oxide and the chemical oxidant are provided in a molar ratio of about 1:0.75 to about 1:2.

16. The method of claim 1, wherein the oxidant comprises a counter cation selected from the group consisting of ammonium, sodium, potassium, lithium, and a combination thereof.

17. The method of claim 16, wherein a counter cation of the oxidant comprises ammonium or sodium and the fluid composition is substantially free of a hydroxide.

18. The method of claim 1, wherein the oxidant comprises two different counter cations selected from the group consisting of ammonium, sodium, and potassium.

19. The method of claim 1, wherein the oxidant is a combination of a sodium peroxydisulfate and a potassium peroxydisulfate.

20. The method of claim 1, wherein y has a value of 0 to 0.29.

21. The method of claim 1, further comprising treating the alkali metal-deficient nickel oxide with an aqueous solution of an alkali hydroxide to form a compound according to the formula: $A_x A'_w H_y Ni_{1+a-z} M_z O_2 \cdot nH_2O$, wherein A comprises Li or Na;

A' comprises K, Cs, or Rb;

$$0.08 \leq x < 0.2;$$

$$0.03 < w < 0.20;$$

$$0 \leq y < 0.3;$$

$$0.02 \leq a \leq 0.2;$$

$$0 \leq z \leq 0.2; \text{ and}$$

$$0 < n < 2.$$

22. The method of claim 21, wherein A comprises Li and A' comprises K.

* * * * *